US012010360B1

(12) United States Patent
Larkin et al.

(10) Patent No.: US 12,010,360 B1
(45) Date of Patent: Jun. 11, 2024

(54) TECHNIQUES FOR RECREATING OUTPUTTING OF CONTENT

(71) Applicant: Amazon Technologies, Inc., Seattle, WA (US)

(72) Inventors: Micheal Anthony Larkin, Pasadena, CA (US); Mustafa Hakim, Tustin, CA (US); Doyle Albert Martin, Rescue, CA (US); Brian Fisher, Lake Forest, CA (US); Mickey Ottis Williams, Fallbrook, CA (US); Chris Predeek, Silverton, OR (US)

(73) Assignee: Amazon Technologies, Inc., Seattle, WA (US)

( * ) Notice: Subject to any disclaimer, the term of this patent is extended or adjusted under 35 U.S.C. 154(b) by 77 days.

(21) Appl. No.: 17/169,964

(22) Filed: Feb. 8, 2021

(51) Int. Cl.
*H04N 21/231* (2011.01)
*H04L 65/70* (2022.01)
*H04N 21/235* (2011.01)
*H04N 21/239* (2011.01)
*H04N 21/44* (2011.01)

(52) U.S. Cl.
CPC ........... *H04N 21/231* (2013.01); *H04L 65/70* (2022.05); *H04N 21/235* (2013.01); *H04N 21/239* (2013.01); *H04N 21/44* (2013.01)

(58) Field of Classification Search
CPC .. H04N 21/231; H04N 21/235; H04N 21/239; H04N 21/44; H04L 65/70
See application file for complete search history.

(56) References Cited

U.S. PATENT DOCUMENTS

| | | | | |
|---|---|---|---|---|
| 6,091,777 A | * | 7/2000 | Guetz | H04N 19/635 375/240.03 |
| 10,891,219 B1 | * | 1/2021 | Dimitropoulos | A63F 13/352 |
| 2014/0368665 A1 | * | 12/2014 | Lirette | H04N 21/6543 348/180 |
| 2015/0350270 A1 | * | 12/2015 | Caras | G06F 3/0488 709/203 |
| 2019/0371327 A1 | * | 12/2019 | Quinn | G10L 15/16 |
| 2020/0107074 A1 | * | 4/2020 | Aggarwal | H04N 21/4882 |
| 2022/0124409 A1 | * | 4/2022 | Wang | H04N 21/252 |

\* cited by examiner

*Primary Examiner* — Yassin Alata
(74) *Attorney, Agent, or Firm* — Lee & Hayes, P.C.

(57) ABSTRACT

This disclosure describes, in part, methods and techniques for recreating the outputting of content by an electronic device. For instance, system(s) may process (e.g., encode) first source data in order to generate second source data. The system(s) may then store the second source data in one or more databases and send a copy of the second source data to the electronic device. The electronic device may process (e.g., decode) the second source data in order to output content represented by the second source data. The electronic device may also generate event data representing events that occurred while processing the second source data. The system(s) may receive the event data from the electronic device and use the event data to process the second source data similar to the electronic device. This way, the system(s) are able to output the content similarly to how the electronic device output the content.

19 Claims, 11 Drawing Sheets

TECHNIQUES FOR RECREATING OUTPUTTING OF CONTENT

BACKGROUND

In order to send data to an electronic device, a system may initially encode the data and then send the encoded data to the electronic device. The electronic device may then receive the encoded data from the system, decode the encoded data, and output content represented by the data. In some circumstances, it may be important to maintain low latency when sending the data to the electronic device. For example, if the data represents content related to a network game, it may be important to maintain low latency so that the electronic device is continuously updating the content to represent state changes of the network game. As such, the system may not have time to retransmit the encoded data to the electronic device. This may cause problems, such as the electronic device not receiving frames represented by the encoded data, the electronic device not decoding all of the received frames, and/or the electronic device not rendering all of the decoded frames.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
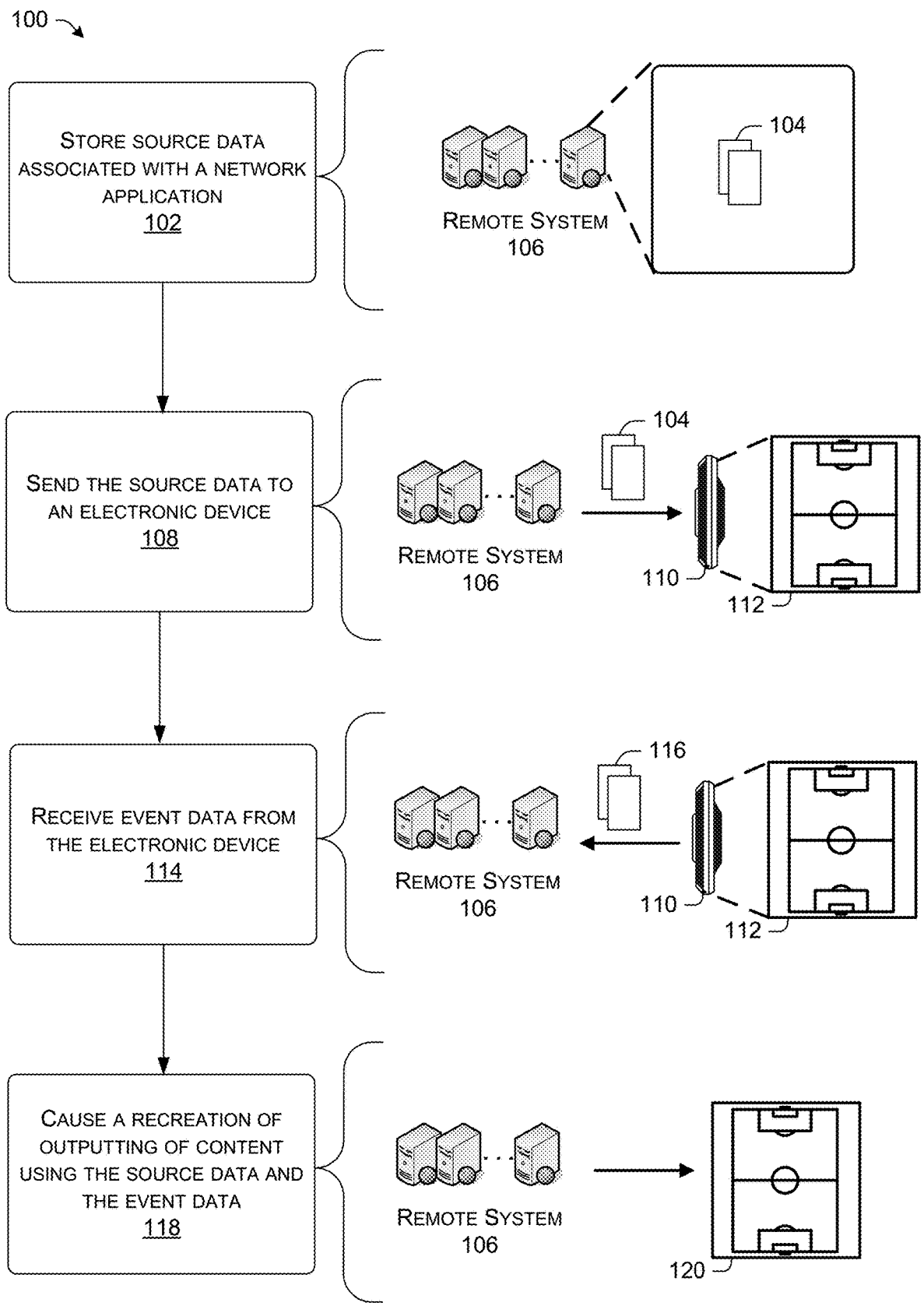
FIG. 1 illustrates an example process for recreating the outputting of content by an electronic device, in accordance with examples of the present disclosure.

This disclosure describes, in part, systems and techniques for recreating the outputting of content by an electronic device. For instance, system(s) may send data representing a network application, such as a network game, to an electronic device. To send the data, the system(s) may encode the data to generate encoded data and then send the encoded data to the electronic device. The electronic device may receive the encoded data, decode the encoded data, and then output content represented by the data. Additionally, the electronic device may generate event data representing events that occur with regard to receiving the encoded data, decoding the encoded data, and/or outputting the content. The system(s) may receive the event data from the electronic device and store the event data in association with the encoded data. Using the event data and the encoded data, the system(s) may then be able to cause a recreation of the content as output by the electronic device. This recreation of the content may be used by one or more users, such as to debug the network application when problems occur.

For more detail, the system(s) may initially process source data, which may be referred to as "first source data" in these examples, in order to generate processed source data, which may be referred to as "second source data" in these examples. The source data may include, but is not limited to, video data, image data, audio data, sensor data, and/or any other type of data. For an example of processing first source data that is video data, the system(s) may encode the video data in order to generate encoded video data (e.g., the second source data). In some examples, encoding the video data may include changing the format of the video data from a first data format (e.g., the raw video data) to a second, different data format (e.g., the encoded video data). In some examples, the system(s) encode the video data using lossy compression, lossless compression, and/or any other type of compression.

The system(s) may then store the second source data in one or more databases. Additionally, in some examples, the system(s) may store, in association with the second source data, data that represents information about the second source data. The information may include, but is not limited to, an identifier of the network application, an identifier of the electronic device, an identifier of a user account associated with the electronic device, a time that the first source data was processed, a time that the second source data was stored, and/or any other information. Additionally, the system(s) may send a copy of the second source data to the electronic device.

In some examples, the system(s) may generate data, which may be referred to as "first event data" in these examples, representing events that occur with the processing of the first source data and/or the sending of the second source data. In some examples, the events are related to different portions of the source data, such as one or more frames represented by the source data. For example, an event performed by the system(s) may include, but is not limited to, portion(s) being generated, the portion(s) being encoded, the portion(s) skipped from being encoded, the portion(s) being send to the electronic device, the portion(s) not being sent to the electronic device, and/or the like.

Additionally, in some examples, the first event data may represent times at which the events occurred. For a first example, if the first source data representing a first frame was encoded by the electronic device at a time, then the first event data for the first frame may include data representing an identifier associated with the first frame, data representing the time, and data representing that the first frame was encoded. For a second example, if a second frame was encoded during a period of time, then the first event data for the second frame may include data representing an identifier associated with the second frame, data representing the period of time (e.g., the start and end times), and data representing that the second frame was encoded. Still, for a third example, if a third frame was sent by the remote system(s) at a time, then the first event data for the third frame may include data representing an identifier associated with the third frame, data representing the time, and data representing that the third frame was sent. In some examples, the first event data may represent more than one event for various portions of the source data.

The electronic device may receive the second source data from the system(s) and process the second source data in order to generate processed source data, which may be referred to as "third source data" in these examples. For an example of processing second source data that is encoded video data, the electronic device may decode the encoded video data received from the system(s) in order to generate decoded video data (e.g., the third source data). In some examples, decoding the encoded video data may include changing the format of the encoded video data from a first data format (e.g., the encoded video data) to a second, different data format (e.g., the decoded video data). After generating the third source data, the electronic device may then output content represented by the third source data.

In some examples, to maintain low latency, the system(s) may only send the second source data to the electronic device a single time (e.g., the system(s) may not retransmit the second source data). This may be because the electronic device continuously processes the second source data and/our outputs the content in "real-time." As such, problems may occur when sending the second source data, decoding the second source data, and/or outputting the content represented by the third source data. For a first example, the electronic device may not receive one or more portions of the second source data from the system(s). For instance, if the source data is encoded video data, the electronic device may not receive one or more frames represented by the encoded video data. For a second example, the electronic device may be unable to decode one or more portions the second source data (e.g., the decoder of the electronic device may skip the one or more portions and/or the decoding of one or more portions may fail). For instance, and again if the second source data is encoded video data, the electronic device may be unable to decode one or more frames represented by the encoded video data.

Still, for a third example, the electronic device may not output content represented by one or more portions of the third source data (e.g., the electronic device may determine to skip outputting the content for latency reasons). For instance, and again if third source content is decoded video data, the electronic device may not render one or more frames represented by the decoded video data. In any of these examples, the quality of the content being output by the electronic device may be degraded. As such, the system(s) may use one or more techniques in order to later recreate the content being output by the electronic device, such as for debugging reasons.

For example, the system(s) may generate data, which may be referred to as "identifier data" in these examples, that represents identifiers for various portions of the second source data. For instance, if the second source data is the encoded video data, the identifier data may represent identifiers for the frames represented by the encoded video data.

For a first example, the identifier data may represent a first identifier associated with a first frame, a second identifier associated with a second frame, a third identifier associated with a third frame, and/or so forth. For a second example, the identifier data may represent a first identifier associated with a first grouping of frames, a second identifier associated with a second grouping of frames, a third identifier associated with a third grouping of frames, and/or so forth. The system(s) may then send, along with the second source data, the identifier data to the electronic device. In some examples, the system(s) sends the identifier data by including the identifier data within the second source data.

The electronic device may also generate data, which may be referred to as "second event data" in these examples, representing events that occur with the processing of the second source data. As described herein, the processing of the second source data may include at least the receiving of the second source data, the decoding of the second source data in order to generate the third source data, and/or the outputting of the content represented by the third source data. In some examples, the events are related to different portions of the source data, such as one or more frames represented by the source data. For example, an event for the source data may include, but is not limited to, portion(s) being received, the portion(s) being queued, the portion(s) skipped from being queued, the portion(s) pending the decoding process, the portion(s) being skipped from being decoded, the portion(s) being decoded, the decoding of the portion(s) failing, the portion(s) being rendered, the portion(s) being skipped from rendering, and/or the like.

Additionally, in some examples, the second event data may represent times at which the events occurred. For a first example, if the second source data representing a first frame was received by the electronic device at a time, then the second event data for the first frame may include data representing the identifier associated with the first frame, data representing the time, and data representing that the first frame was received. For a second example, if a second frame was decoded during a period of time, then the second event data for the second frame may include data representing the identifier associated with the second frame, data representing the period of time (e.g., the start and end times), and data representing that the second frame was decoded. Still, for a third example, if a third frame was rendered by the electronic device at a time, then the second event data for the third frame may include data representing the identifier associated with the third frame, data representing the time, and data representing that the third frame was rendered. In some examples, the second event data may represent more than one event for various portions of the source data.

Additionally, in some examples, the second event data may not represent one or more events for different portions of the source data, which may indicate problem(s) that occurred. For a first example, if the electronic device does not receive second source data representing a fourth frame, then the second event data may not represent an event associated with the fourth frame. This may indicate that the second source data representing the fourth frame was not received by the electronic device. For a second example, if the electronic device did not decode a fifth frame represented by the second source data, then the second event data may not represent a time at which the fifth event was decoded. For instance, the second event data may include data representing the identifier associated with the fifth frame, data representing a time at which the second source data representing the fifth frame was received by the electronic device, but not include data representing a decoding of the fifth frame. This may indicate that the second source data representing the fifth frame was received, but that the fifth frame was not decoded and/or rendered by the electronic device.

Still, for a third example, if the electronic device did not render a sixth frame represented by the third source data, then the second event data may not represent a time at which the sixth frame was rendered. For instance, the second event data may include data representing the identifier associated with the sixth frame, data representing a time at which the second source data representing the sixth frame was received by the electronic device, data representing a time at which the second source data representing the sixth frame was decoded, but not include data representing a rendering of the sixth frame. This may indicate that the second source data representing the fifth frame was received and decoded, but that the sixth frame was not rendered by the electronic device.

The electronic device may then send the second event data to the system(s). In some examples, the electronic device sends the second event data to the system(s) as the electronic device is generating the second event data (e.g., in near real-time). In some examples, the electronic device sends the second event data to the system(s) at given times (e.g., at given time intervals, when finished accessing the network application, etc.). Still, in some examples, the electronic device sends the second event data to the system(s) when a problem occurs with the source data. For example, when rendering the content, the user of the electronic device may identify a problem, such as the rendering of the content skipping. As such, the electronic device may receive, from the user, an input indicating that the problem occurred. In some examples, the input may correspond to a selection of an interface element (e.g., a button) provided with the content. In response to the input, the electronic device may send the second event data and/or additional data indicating that the problem occurred to the system(s).

The system(s) may receive the second event data from the electronic device and then store, in the one or more databases, the second event data in association with the second source data. In some examples, the system(s) create the association by generating data, which may be referred to as "diagnostics data" in these examples, that associates the second source data to the second event data. In some examples, the system(s) create the association by generating a data packet that includes the second source data and the second event data. Still, in some examples, the system(s) may associate additional data with the second source data. For example, the system(s) may store input data, network quality data, and/or any other type of data in association with the second source data.

The system(s) may then use at least the first event data, the second event data, and/or the source data to "recreate" the outputting of the content by the electronic device. For example, and if the second source data is the encoded video data, then the system(s) may use the encoded video data and the second event data to replay the content that was rendered by the electronic device. In some examples, the system(s) recreate the outputting of the content by processing, using one or more processing components, the second source data using similar events at similar times as represented by the second event data.

For example, such as when the second source data is the encoded video data, the system(s) may use the first event data and/or the second event data to determine which frames represented by the encoded video data were received by the electronic device and which frames represented by the encoded video data were not received by the electronic device. This way, the system(s) are able to determine which frames represented by the encoded video data may have actually been rendered by the electronic device. Additionally, the system(s) may use the second event data to determine the times at which the frames were received by the electronic device. This may indicate to the system(s) when the encoded video data representing the frames should begin to be decoded (e.g., a frame could not have been decoded by the electronic device until the frame was received by the electronic device).

The system(s) may then process the second source data according to the processing times represented by the second event data. For example, and again if the second source data is the encoded video data, and if the second event data indicates that a first frame was decoded at a first time followed by a second frame being decoded at a second time, then the system(s) may decode the first frame at a third time that is based on the first time followed by decoding the second frame at a fourth time that is based on the second time. For instance, the time difference between the first time and the second time may be substantially equivalent to the time difference between the third time and the fourth time. The system(s) may then perform similar decoding processes for each of the other frames represented by the encoded video data. In other words, the system(s) may not only decode the frames using the same order as represented by the second event data, but also decode the frames using similar times as represented by the second event data. This will cause the decoding performed by the system(s) to be similar to the decoding that was performed by the electronic device.

Furthermore, the system(s) may output portions of the third source data according to the outputting times represented by the second event data. For example, and again if the third source data is the decoded video data, and if the second event data indicates that the first frame, as decoded, was rendered at a fifth time followed by the second frame, as decoded, was rendered at a sixth time, then the system(s) may render the first frame at a seventh time that is based on the fifth time followed by rendering the second frame at an eighth time that is based on the sixth time. For instance, the time difference between the fifth time and the sixth time may be substantially equivalent to the time difference between the seventh time and the eighth time. The system(s) may then perform similar rendering processes for each of the other frames represented by the decoded video data. In other words, the system(s) may not only render the frames using the same order as represented by the second event data, but also render the frames using similar times as represented by the second event data. This will cause the rendering performed by the system(s) to be similar to the rendering that was performed by the electronic device.

While these examples describe the system(s) performing three different events (e.g., the receiving of the second source data, the decoding of the second source data, and the outputting of the content represented by the third source data) similar to electronic device, in other examples, the system(s) may perform additional and/or alternative events similar to the electronic device. For a first example, if the second event data indicates that one or more frames were not decoded, then the system(s) may also not decode the one or more frames. For a second example, if the second event data indicates that one or more frames were not rendered, then the system(s) may also not render the one or more fames. This way, the outputting of the content by the system(s) is similar to the outputting of the content by the electronic device. In some instances, this allows one or more users, such as a user debugging the network application, to see how problems affect the outputting of the content.

In some examples, the system(s) may provide additional information with the outputting of the content. For example, the system(s) may provide a user interface that indicates the events that are occurring and/or the times that the events are occurring while the content is being output (e.g., such as by using a timeline). For instance, if the source data is video data, then the user interface may indicate when a frame is being decoded and/or when a frame is being rendered. In some examples, the user interface may further indicate inputs that were received by the system(s), network quality information, and/or any other type of information that is relevant to the outputting of the content.

As described herein, the system(s) may provide access to network applications. For instance, to access a network application, the system(s) may send, to the electronic device, source data (e.g., video data, audio data, etc.) representing a first state of the network application. For example, if the network application includes a gaming application, the first state of the network application may include an object (e.g., a character) located at a first position within a gaming environment (e.g., a forest). The electronic device may receive the source data from the system(s) and, using the source data, the electronic device may display image(s) representing the first state of the network application. For example, and again if the network application includes the gaming application, the electronic device may display content representing the object located at the first position within the gaming environment. In some instances, the electronic device may further output sound represented by the audio data. A user may then use a control device (e.g., a gaming controller) and/or the electronic device to provide inputs to the network application via the system(s).

For example, the control device may receive an input, such as a selection of a button, joystick, key, touch-sensitive pad, sensor, and/or the like associated with the control device. The control device may then send, to the system(s), input data representing the input. Using the input data, the system(s) may update the first state of the application to a second state of the application. For example, and again if the network application includes the gaming application, the input may be associated with moving the object forward by a given amount within the gaming environment. As such, the system(s) may update the first state of the application to the second state of the application by moving the object forward in the environment by the given amount.

The system(s) may then send, to the electronic device, source data (e.g., video data, audio data, etc.) representing the second state of the application. Using the source data, the electronic device may display image(s) representing the second state of the game. For example, the electronic device may display content representing the object located at the second position within the gaming environment. Additionally, in some instances, the electronic device may output sound represented by the audio data. The system(s) may then continue to perform similar processes to update the state of the network application on the electronic device as the system(s) continues to receive input data from the control device and/or the electronic device. Additionally, while the electronic device is continuing to receive the source data and output the content, the electronic device may be generating the event data associated with the network application.

As described herein, an identifier may include, but is not limited to, a name, a username, a numerical identifier, an alphabetic identifier, a mixed numerical and alphabetic identifier, and/or any other type of identifier. Additionally, a time difference may be substantially equal to another time difference when the time differences are within 1 millisecond, 10 milliseconds, 100 milliseconds, and/or any other time period. Furthermore, data formats may include, but are not limited to, MPEG-4, QuickTime Move, Audio Video Interleave, Flash Video Format, WebM, and/or any other type of data format that may be communicated between devices and/or processed by devices.

By performing the processes described herein, the system(s) are able to recreate the outputting of the content as performed by the electronic device. This may be useful for many reasons. For example, if a problem occurred with the outputting of the content by the electronic device, such as a quality of the content being displayed by the electronic device being degraded, then a user that is debugging the network application may be able to both determine why the problem occurred (e.g., skipped frames) and see how the problem effected the quality of the displayed content. For another example, if a user of the electronic device wants to share an experience that occurred while accessing the network application, then the system(s) may provide the electronic device with the necessary data (e.g., the second source data, the event data, etc.) to recreate the experience.

FIG. 1 illustrates an example process 100 for recreating the outputting of content by an electronic device, in accordance with examples of the present disclosure. At 102, the process 100 may include storing source data 104 associated with a network application. For instance, remote system(s) 106 may store the source data 104 associated with the network application. In the example of FIG. 1, the source data 104 is video data, which is represented by the frames of the source data 104. Additionally, the network application is a network game, such as a network soccer game that is provided by the remote system(s) 106. In some examples, the remote system(s) 106 further generate and store identifier data representing identifiers of the frames represented by the source data 104. In some examples, the source data 104 was encoded by the remote system(s) 106.

At 108, the process 100 may include sending the source data 104 to an electronic device 110. For instance, the remote system(s) 106 may send the source data 104 to the electronic device 110. In some examples, the remote system(s) 106 further send the identifier data to the electronic device 110. The electronic device 110 may then use the source data 104 to output content 112 represented by the source data 104. For example, the electronic device 110 may decode the source data 104 in order to generate decoded source data 104 and then render the content 112 represented by the decoded source data 104.

At 114, the process 100 may include receiving event data 116 from the electronic device 110. For instance, as the electronic device 110 is receiving the source data 104, decoding the source data 104, and outputting the content 112 represented by the decoded source data 104, the electronic device 110 may be generating the event data 116. The event data 116 may represent the identifiers of the frames, the events that occurred with respect to the frames, and/or the times that the events occurred. The remote system(s) 106 may then receive the event data 116 from the electronic device 110. In some examples, the electronic device 110 retransmits the event data 116 to the remote system(s) 106 in order to ensure that the remote system(s) 106 receive all of the event data 116 generated by the electronic device 110.

At 118, the process 100 may include causing a recreation of outputting of content using the source data 104 and the event data 116. For instance, the remote system(s) 106 may use the source data 104 and the event data 116 to cause the recreation of the outputting of the content, which is represented by 120. In some instances, the remote system(s) 106 cause the recreation by outputting the content 120 using one or more components, such as a display. In some examples, the remote system(s) 106 cause the recreation by sending the source data 104 and the event data 116 to another electronic device that then uses the source data 104 and the event data 116 to output the recreation of the content 120.

As shown, the content 120 that is recreated by the remote system(s) 106 is similar to the content 112 that was output by the electronic device 110. This is because the remote system(s) 106 processed the source data 104 similarly to how the electronic device 110 processed the source data 104. For example, the remote system(s) 106 may have only used frames that were received by the electronic device 110, decoded the frames using similar times as the electronic device 110, and then render the content represented by the frames using similar times as the electronic device 110. As such, any problems that occurred with the processing of the source data 104 and/or the rendering of the content 112 by the electronic device 110 would also occur with the processing of the source data 104 and/or the rendering of the content 120 by the remote system(s) 106.

Figure 2:
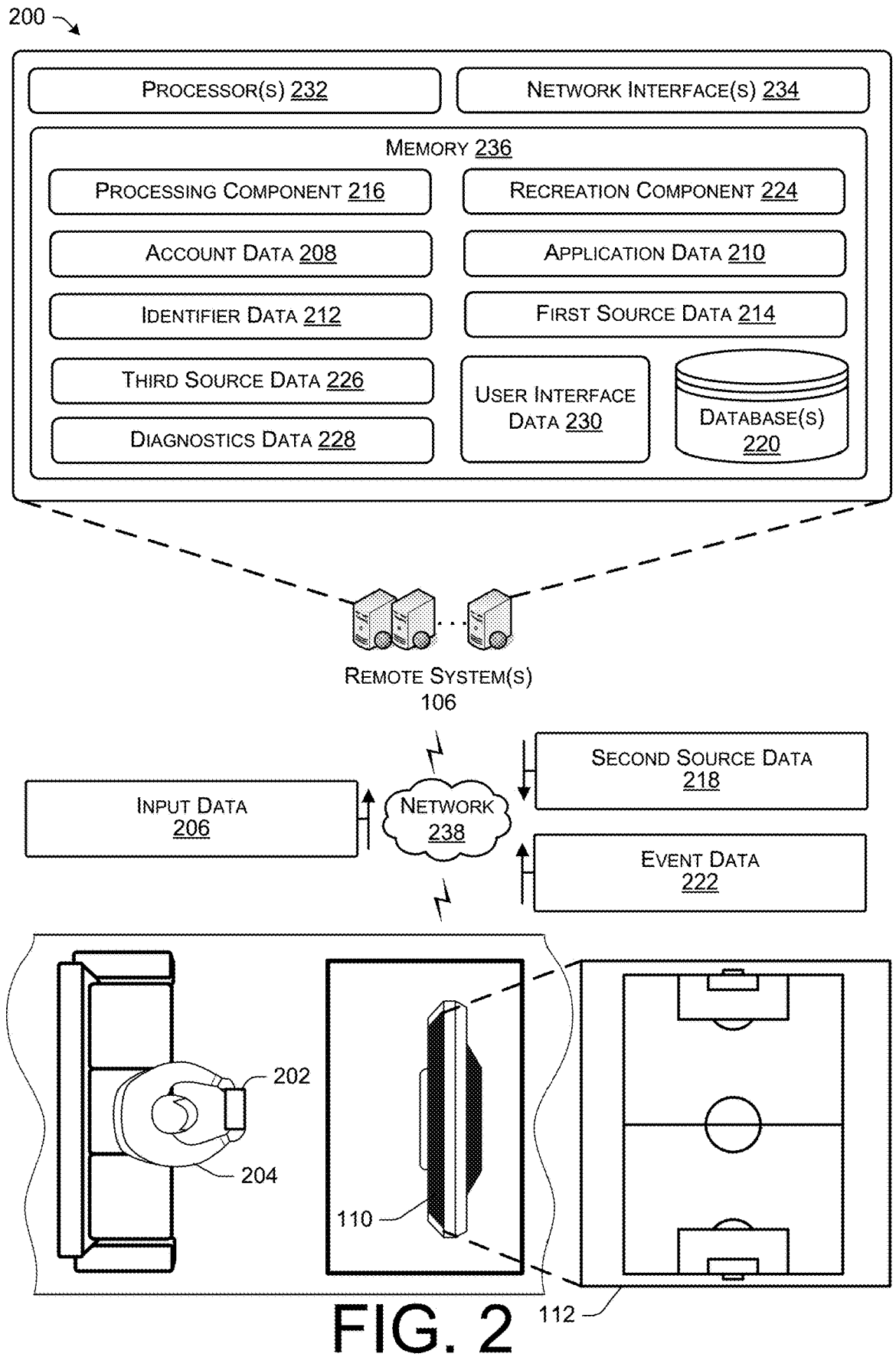
FIG. 2 illustrates a schematic diagram of an example system for recreating the outputting of content by an electronic device, in accordance with examples of the present disclosure.

FIG. 2 illustrates a schematic diagram of an example system 200 for recreating the outputting of the content 112 by the electronic device 110, in accordance with examples of the present disclosure. The system 200 may include, for example, the remote system(s) 106, the electronic device 110, and a control device 202.

In the example of FIG. 2, a user 204 may want to access (e.g., play) the network application provided by the remote system(s) 106. To access the network application, the control device 202 and/or the electronic device 110 may receive, from the user 204, one or more inputs representing credentials associated an account associated with the user 204. For example, the credentials may be for logging into the account associated with the user 204. The remote system(s) 106 may then receive, from the control device 202 and/or the electronic device 110, input data 206 representing the one or more inputs. Using the input data 206, the remote system(s) 106 may identify the account associated with the user 204. For example, the remote system(s) 106 may match the credential represented by the input data 206 with additionally credentials represented by account data 208, where the account data 208 represents at least the account associated with the user 204. Based on the match, the remote system(s) 106 may identify the account associated with the user 204.

The user 204 may then select the network application. For example, the electronic device 110 may display a list of network applications that may be accessed by the user 204, where the network applications are represented by application data 210. While displaying the list, the electronic device 110 and/or the control device 202 may receive, from the user 204, an input selecting the network application. The electronic device 110 and/or the control device 202 may then send, to the remote system(s) 106, input data 206 representing the input and/or identifier data 212 representing an identifier associated with the network application. Using the input data 206 and/or the identifier data 212, the remote system(s) 106 may identify the network application. For example, the remote system(s) 106 may match the identifier represented by the identifier data 212 to an additional identifier represented by the application data 210. Based on the match, the remote system(s) 106 may identify the network application.

The remote system(s) 106 may then begin to generate first source data 214 for the network application. The first source data 214 may include, but is not limited to, video data, image data, audio data, sensor data, and/or any other type of data. In some examples, the first source data 214 may represent raw source data associated with the network application. In some examples, the first source data 214 represents a state of the network application. For example, if the network application is a network game, the first source data 214 may represent a first state of the network game, such as an object (e.g., a character) located at a first position within a gaming environment (e.g., a forest). The remote system(s) 106 may then continue to receive input data 206 from the control device 202 and/or the electronic device 110. Using the input data 206, the remote system(s) 106 may continue to update the state of the network application and generate first source data 214 represented the updated states. The remote system(s) 106 may also provide the first source data 214 to the electronic device 110.

For example, a processing component 216 of the remote system(s) 106 may process the first source data 214 in order to generate second source data 218 (which may include, and/or represent, the source data 104). In some examples, the processing component 216 may include one or more data encoders that encode the first source data 214 in order to generate the second source data 218 (e.g., encoded source data). For example, if the first source data 214 is video data, then the processing component 216 may include one or more video encoders that convert the first source data 214 from a first data format to a second data format, where the second data format is represented by the second source data 218. In some examples, the second source data 218 may further represent identifiers associated with various portions of the second source data 218. For example, if the first source data 214 is video data, then the second source data 218 may represent identifiers of frames represented by the second source data 218. The remote system(s) 106 may then store the second source data 218 in one or more databases 220.

Additionally, and as shown by the example of FIG. 2, the remote system(s) 106 may send the second source data 218 to the electronic device 110. As described in more detail below, the electronic device 110 may process the second source data 218 in order to generate third source data that can be output by the electronic device 110. The electronic device 110 may also generate event data 222 representing one or more events that occur with the processing of the second source data 218 (e.g., the receiving of the second source data 218, the decoding of the second source data 218, and/or the outputting of the content 112). As described herein, for video data, an event may include, but is not limited to, frame(s) being received, the frame(s) being queued, the frame(s) skipping from being queued, the frame(s) pending for the decoding process, the frame(s) being skipped from being decoded, the frame(s) being decoded, the decoding of the frame(s) failing, the frame(s) being rendered, the frame(s) being skipped from rendering, and/or the like.

The event data 222 may further represent times that the one or more events occurred with the processing of the second source data 218. For a first example, if the electronic device 110 received a frame represented by the second source data 218 at a time, then the event data 222 may represent the identifier associated with the frame, the time, and that the event included the frame being received. For a second example, if the electronic device 110 decoded a frame represented by the second source data 218 during a time period that includes a start time and an end time, then the event data 222 may represent an identifier associated with the frame, the start time, the end time, and that the event included the frame being decoded. Still, for a third example, if the electronic device 110 rendered a frame at a time, then the event data 222 may represent an identifier associated with the frame, the time, and that the event included the frame being rendered. While these are just a couple examples of events that may be represented by the event data 222, in other examples, the event data 222 may represent additional and/or alternative events.

Also, and as described herein, the event data 222 may indicate problems based on the event data 222 not representing events. For a first example, if the electronic device 110 did not receive a frame represented by the second source data 218, then the event data 222 may not represent an identifier associated with the frame and/or any additional information associated with the frame. For a second example, if the electronic device 110 did not decode a frame, then the event data 222 may represent an identifier associated with the frame and a time that the electronic device 110 received the frame, but not a time that the electronic device 110 decoded the frame. Still, for a third example, if the electronic device 110 did not render a frame, then the event data 222 may represent an identifier associated with the frame, a time that the electronic device 110 received the frame, and a time that the electronic device 110 decoded the frame, but not a time that the electronic device 110 rendered the frame.

As shown by the example of FIG. 2, the remote system(s) 106 may receive the event data 222 from the electronic device 110. The remote system(s) 106 may then store the event data 222 in the database(s) 220. In some examples, the remote system(s) 106 may generate data (e.g., diagnostics data) that associates the second source data 218 with the event data 222. For a first example, the data may map the second source data 218 to the event data 222. For instance, the data may represent a first identifier associated with the second source data 218, a second identifier associated with the event data 222, and an indication that the first identifier is associated with the second identifier. For a second example, the data may include a data packet that includes the second source data 218 and the event data 222. In either of the examples, the remote system(s) 106 are then able to recreate the outputting of the content 112 by the electronic device 110 using the second source data 218 and the event data 222.

For example, to recreate the outputting of the content, a recreation component 224 of the remote system(s) 106 (and/or one or more other devices) may use the event data 222 in order to process the second source data 218 similarly to the electronic device 110. For example, such as when the second source data 218 is video data, the recreation component 224 may use the event data 222 to determine which frames represented by the second source data 218 were received by the electronic device 110 and which frames represented by the second source data 218 were not received by the electronic device 110. This way, the recreation component 224 is able to determine which frames represented by the second source data 218 may have actually been rendered by the electronic device 110. Additionally, the recreation component 224 may use the event data 222 to determine the times at which the frames were received by the electronic device 110. This may indicate to the recreation component 224 when to process the frames represented by the second source data 218.

For example, the recreation component 224 may process (e.g., decode) the second source data 218 according to the processing times represented by the event data 222. For example, if the event data 222 indicates that the electronic device 110 decoded a first frame at a first time followed by decoding a second frame at a second time, then the recreation component 224 may decode the first frame at a third time that is based on the first time followed by decoding the second frame at a fourth time that is based on the second time. For instance, the time difference between the first time and the second time may be substantially equivalent to the time difference between the third time and the fourth time. The recreation component 224 may then perform similar decoding processes for each of the other frames. In other words, the recreation component 224 may not only decode the frames using the same order as represented by the event data 222, but also decode the frames using similar times as represented by the event data 222. This will cause the processing performed by the recreation component 224 to be similar to the processing that was performed by the electronic device 110. In the example of FIG. 2, the processed source data may be represented by third source data 226.

Furthermore, the recreation component 224 may cause outputting of portions of the third source data 226 according to the outputting times represented by the event data 222. For example, if the event data 222 indicates that the electronic device 110 rendered the first frame, as decoded, at a fifth time followed by rendering the second frame, as decoded, at a sixth time, then the recreation component 224 may render the first frame at a seventh time that is based on the fifth time followed by rendering the second frame at an eighth time that is based on the sixth time. For instance, the time difference between the fifth time and the sixth time may be substantially equivalent to the time difference between the seventh time and the eighth time. The recreation component 224 may then perform similar rendering processes for each of the other frames. In other words, the recreation component 224 may not only render the frames using the same order as represented by the event data 222, but also render the frames using similar times as represented by the event data 222. This will cause the rendering performed by the recreation component 224 to be similar to the rendering that was performed by the electronic device 110.

In some examples, by using the event data 222 to process the second source data 218 and/or render the third source data 226, the remote system(s) 106 may refrain from processing (e.g., decoding) frames represented by the second source data 218 that were also not decoded by the electronic device 110. Additionally, the remote system(s) 106 may refrain from rendering frames represented by the third source data 226 that were not rendered by the electronic device 110. In other words, the remote system(s) 106 may cause an outputting of content that is similar to the content 112 that was output by the electronic device 110.

In some examples, the remote system(s) 106 (and/or the electronic device 110) may also generate diagnostics data 228 that represents information about the events. For example, the diagnostics data 228 may represent a timeline that includes entries indicating the events that occurred when processing the second source data 218 and/or entries indicating events that occur when rendering the content represented by the third source data 226. For example, and if the source data is video data, the diagnostics data 228 may represent entries indicating at least times that the frames were received, times that the frames were decoded, and times that the frames were rendered. While these are just few examples of entries that may be included in the timeline, in other examples, the timeline may include additional and/or alternative events.

Figure 4:
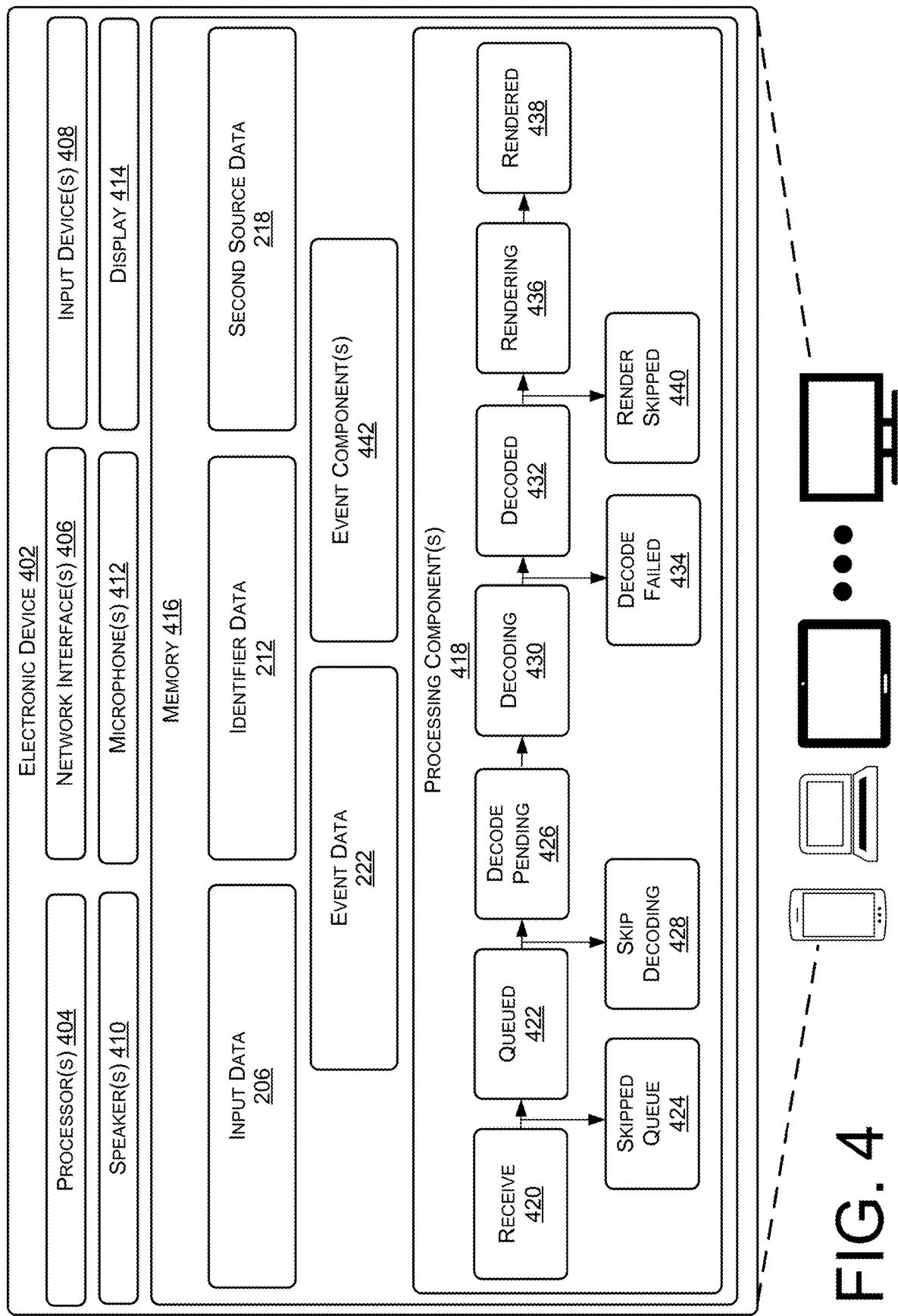
FIG. 4 illustrates a block diagram of an example architecture of an electronic device, in accordance with examples of the present disclosure.

In some examples, the remote system(s) 106 may generate user interface data 230, where the user interface data 230 represents a user interface for rendering the content. For example, and as illustrated in FIG. 4, the user interface may include at least video represented by the third source data 226 and the timeline represented by the diagnostics data 228. The remote system(s) 106 may then provide the user interface to one or more users, such as when the one or more users are debugging the network application.

As further illustrated in the example of FIG. 2, the remote system(s) 106 may include processor(s) 232, network interface(s) 234, and memory 236. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the Free-BSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the remote system(s) 106, the electronic device 110, the control device 202, and/or with one or more other remote systems, as well as other networked devices. The network interface(s) may include one or more network interface controllers (NICs) or other types of transceiver devices to send and receive messages over the network(s) 238. For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 3:
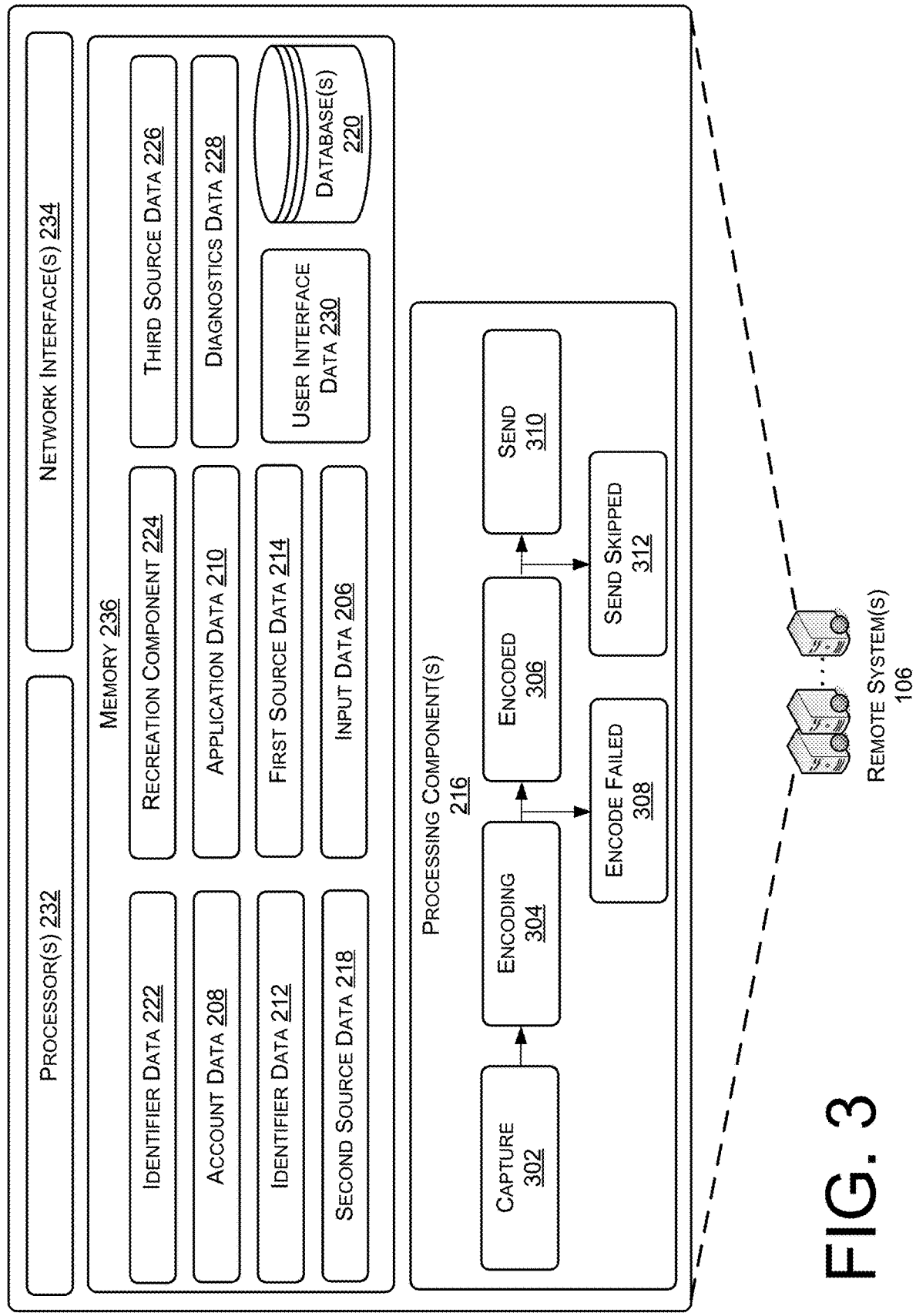
FIG. 3 illustrates a block diagram of an example architecture of processing component(s) for the remote system(s), in accordance with examples of the present disclosure.

FIG. 3 illustrates a block diagram of an example architecture of processing component(s) for the remote system(s) 106, in accordance with examples of the present disclosure. As shown, the processing component(s) 216 may process the first source data 214 and/or the second source data 218 using various stages. In some examples, each of the stages may represent an event that occurs to the first source data 214 and/or the second source data 218 by the remote system(s) 106. Although the example of FIG. 4 illustrates six different stages, in other examples, the processing component(s) 216 may process the first source data 214 and/or the second source data 218 using more or less stages.

As shown, the processing component(s) 216 may initially capture the first source data 214 at stage 302. The capturing of the first source data 214 may include generating the first source data 214 (e.g., updating the state of the network application using the input data 206), receiving the first source data 214, and/or the like. The processing component(s) 216 may then encode the first source data 214 at stage 304. Based on the encoding, portion(s) of the first source data 214 may be encoded at stage 306 (which may represent the second source data 218) or portion(s) of the first source data 214 may fail from being encoded at stage 308.

Next, the processing component(s) 216 may cause portion(s) of the second source data 218 to be sent at stage 310 or may refrain from sending portion(s) of the second source data 218 at 312.

In some examples, the remote system(s) 106 generates event data 222 for each stage of the processing that is performed by the processing component(s) 216. For instance, and for a portion (e.g., a frame) of the source data, the remote system(s) 106 may generate the event data 222 representing an identifier associated with the portion of the source data, a time that the portion was captured at stage 302, a time that the portion began encoding at stage 304, a time that the portion was encoded at stage 306, a time that the portion failed encoding at 308, a time that the portion was sent at stage 310, and/or a time that the portion was skipped from being sent at stage 312. In some examples, the remote system(s) 106 may include a respective component that is located after each of the stages 302-312 of the processing pipeline that is performed by the processing component(s) 216. These component(s) may be configured to generate the event data 222 for the processing pipeline.

As described above, the electronic device 110 may process the second source data 218 in order to output the content. As such, FIG. 4 illustrates a block diagram of an example architecture of an electronic device 402, in accordance with examples of the present disclosure. In some examples, the electronic device 402 may include, and/or represent, the electronic device 110. As shown, the electronic device 402 may include at least one or more processors 404, one or more network interfaces 406, one or more input devices 408, one or more speakers 410, one or more microphones 412, a display 414, and memory 416. However, in other examples, the electronic device 402 may include one or more additional components and/or may not include one or more of the components illustrated in the example of FIG. 4. For example, the electronic device 402 may not include the input device(s) 408, the speaker(s) 410, the microphone(s) 412, and/or the display 414.

As shown, the electronic device 402 may also include processing component(s) 418 for processing the second source data 218 received from the remote system(s) 106. As shown, the processing component(s) 418 may process the second source data 218 using various stages. In some examples, each of the stages may represent an event that occurs to the second source data 218 by the electronic device 402. Although the example of FIG. 4 illustrates eleven different stages for processing the second source data 218, in other examples, the processing component(s) 418 may process the second source data 218 using more or less stages. Additionally, in other examples, the processing component(s) 418 may process the second source data 218 using additional and/or alternative stages.

As shown, the processing component(s) 418 may initially process the second source data 218 by receiving the second source data 218 at stage 420. As described above, in some examples, the processing component(s) 418 may not receive all of the second source data 218 from the remote system(s) 106. For example, if the second source data 218 is encoded video data, the processing component(s) 418 may not receive all of the frames represented by the encoded video data. The processing component(s) 418 may then either determine whether to queue the second source data 218 at stage 422 or skip the queueing of the second source data 218 at stage 424. Portions of the second source data 218 that are skipped from being queued at stage 424 may not be further processed by the processing component(s) 418. As such, content represented by those portions of the second source data 218 may not be rendered by the electronic device 402.

Next, the processing component(s) 418 may either place the second source data 218 in a stage that prepares the second source data 218 for decoding at stage 426 or skip the decoding of the second source data 218 at stage 428. Again, portions of the second source data 218 that are skipped from being decoded may not be further processed by the processing component(s) 418. As such, content represented by those portions of the second source data 218 may not be rendered by the electronic device 402.

Next, the processing component(s) 418 may decode the second source data 218 that was pending decoding at stage 430. The portions of the second source data 218 that were decoded by the processing component(s) 418 may then be represented by decoded source data at stage 432. In some examples, the decoded source data may be similar to the third source data 226 that the remote system(s) 106 use to recreate the outputting of the content by the electronic device 402. However, the decoding of other portions of the second source data 218 may fail at stage 434. Again, portions of the second source data 218 that fail decoding may not be further processed by the processing component(s) 418. As such, content represented by those portions of the second source data 218 may not be rendered by the electronic device 402.

Next, the processing component(s) 418 may determine which portions of the decoded source data are to begin rendering at stage 436. Content represented by those portions of the decoded source data may then finally be rendered at stage 438. However, the processing component(s) 418 may determine to skip the rendering of some of the portions of the decoded source data at stage 440. As such, content represented by those portions of the decoded source data may not be rendered by the electronic device 402.

As further illustrated by the example of FIG. 4, the electronic device 402 may include event component(s) 442 that generates the event data 222. In some examples, the event component(s) 442 generates the event data 222 for each stage of the processing that is performed by the processing component(s) 418. For instance, and for a portion (e.g., a frame) of the second source data 218, the event component(s) 442 may generate the event data 222 representing an identifier associated with the portion of the second source data 218, a time that the portion was received at stage 420, a time that the portion was queued at stage 422, a time that the portion skipped being queued at stage 424, a time that the portion was pending decoding at stage 426, a time that the portion skipped decoding at stage 428, a time that the portion was decoded at 430, a time that the decoding of the portion was successful at stage 432, a time that the decoding of the portion failed at 434, a time that the portion began rendering at 436, at time that the portion was actually rendered at 438, and/or a time that the portion was skipped for rendering at 440.

The event component(s) 442 may generate similar event data 222 for each portion (e.g., each frame) of the second source data 218. In some examples, the event component(s) 442 groups portions of the second source data 218 together when generating the event data 222. For example, the event component(s) 442 may generate event data 222 representing times that a group of frames (e.g., two or more frames) were processed at the various stages of the processing pipeline. In some examples, the event component(s) 442 may use time periods for one or more stages of the processing pipeline. For example, the decoding 430 stage may include a start time and an end time for processing a portion of the second source data 218.

In some examples, the event component(s) 442 may include a respective event component 442 that is located after each of the stages 420-440 the processing pipeline that is performed by the processing component(s) 418. For example, a first event component 442 may be located after the receiving stage 420, a second event component 442 may be located after the queued stage 422, a third event component 442 may be located after the decoding stage 430, and/or so forth. In such an example, each event component 442 may be configured to generate event data 222 representing the events that occurred to the source data and/or the time that the events occurred to the source data at that respective stage 420-440. For example, the event component 442 located after the decoding stage 430 may be configured to generate the event data 222 representing the times that the portions of the second source data 218 were decoded by the processing component(s) 418.

It should be noted that, while the example of FIG. 4 illustrates the electronic device 402 as including a mobile phone, a laptop computer, a table, or a monitor, in other examples, the electronic device 402 may include any type of electronic device that is able to receive the second source data 218, process the second source data 218, and/or output content.

Figure 5A:
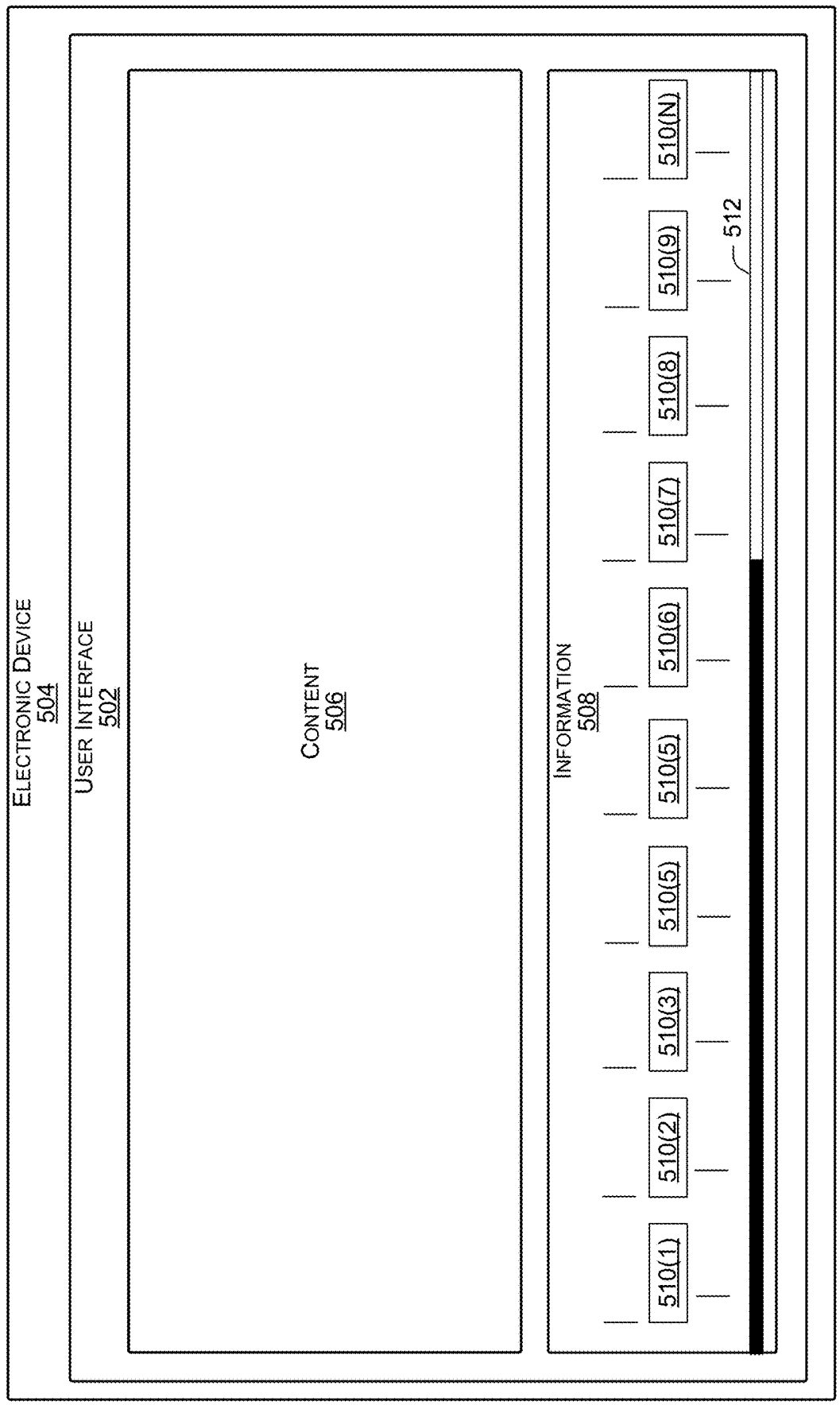
FIG. 5A illustrates an example of a user interface for recreating content displayed by an electronic device, in accordance with examples of the present disclosure.

FIG. 5A illustrates an example of a user interface 502 for recreating the rendering of content displayed by the electronic device 302, in accordance with examples of the present disclosure. As shown, an electronic device 504 may display the user interface 502. In some examples, the electronic device 504 may be similar to the electronic device 302. Additionally, or alternatively, in some examples, the electronic device 504 may include a component of the remote system(s) 106.

As shown, the user interface 502 includes a first portion that renders the recreation of content 506 as displayed by the electronic device 302. The user interface 502 also includes a second portion that displays information 508 related to the processing of the second source data 218 by the electronic device 302. For example, the information 506 may include a timeline of events 510(1)-(N) that occurred when processing the second source data 218 by the electronic device 302. The information 508 further includes a timing bar 512 that a user may use to move to different times associated with the content 506.

Figure 5B:
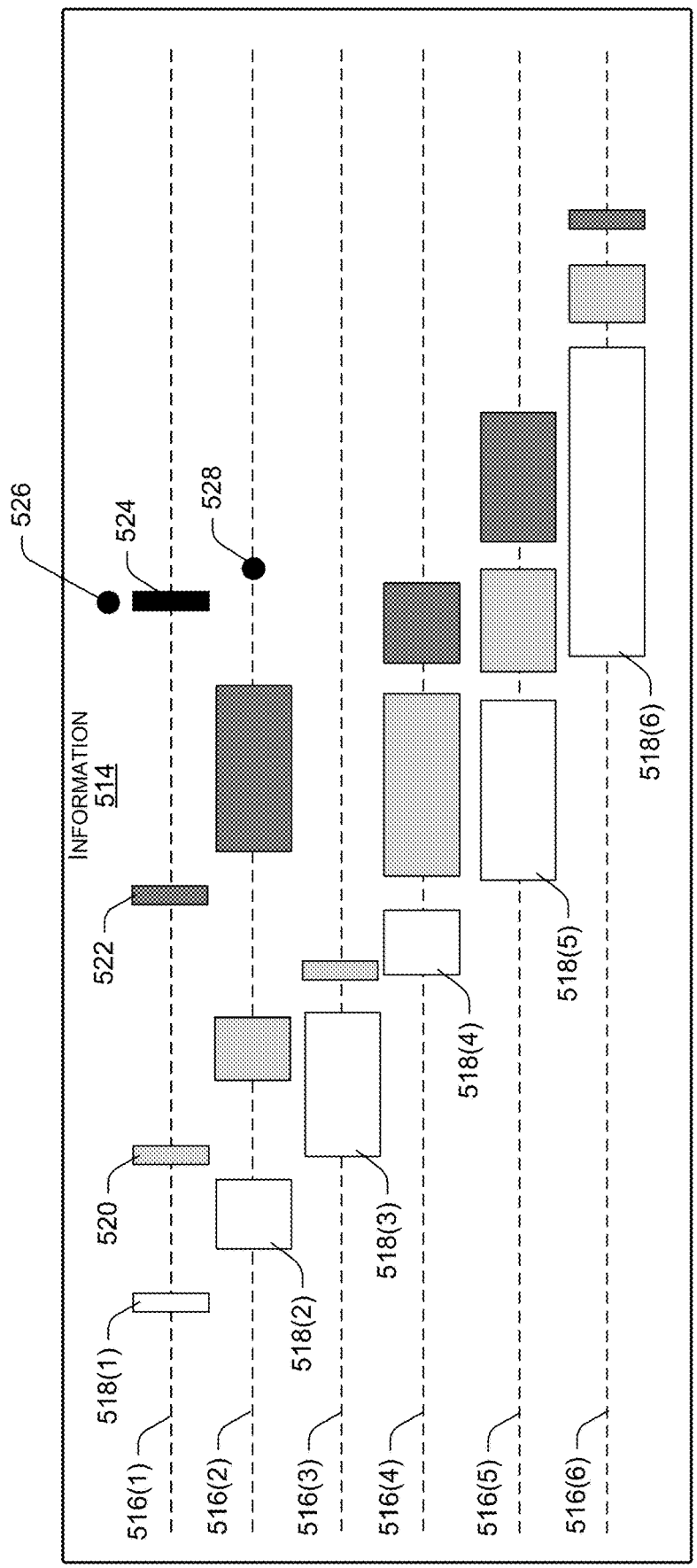
FIG. 5B illustrates an example of additional information that may be provided with the user interface, where the information indicates timings of events, in accordance with examples of the present disclosure.

FIG. 5B illustrates an example of additional information 514 that may be provided with the user interface 512, where the information 514 indicates timings of events (e.g., a timeline of events), in accordance with examples of the present disclosure. In some examples, the user interface 502 includes the information 514 rather than the information 508. However, in other examples, the user interface 502 includes both the information 508 and the information 514.

As shown, the information 514 includes indicators 516(1)-(6) of different events that occurred when processing the first source data 214 by the remote system(s) 106 and/or processing the second source data 218 by the electronic device 110. For example, the events may include capturing the first source data 214, encoding the first source data 214 to generate the second source data 218, sending the second source data 218, receiving the second source data 218, decoding the second source data 218 in order to generate the third source data, and/or outputting the content 112 represented by the third source data. While these are just a few examples of the events that may be represented by the indicators 516(1)-(6), in other examples, the indicators 516(1)-(6) may represent additional and/or alternative events. Additionally, while the information 514 illustrated in the example of FIG. 5B illustrates six indicators 516(1)-(6) for six events, in other example, the information 516 may include any number of indicators for any number of events.

As further shown, the information 514 includes graphical elements 518(1)-(6) (also referred to as "graphical elements 518") that indicate times at which the events occurred with a portion of the source data, such as a frame. For example, the first graphical element 518(1) may represent first time(s) that the first event represented by the first indicator 516(1) occurred to the portion of the source data, the second graphical element 518(2) may represent second time(s) that the second event represented by the second indicator 516(2) occurred to the portion of the source data, the third graphical element 518(3) may represent third time(s) that the third event represented by the third indicator 516(3) occurred to the portion of the source data, the fourth graphical element 518(4) may represent fourth time(s) that the fourth event represented by the fourth indicator 516(4) occurred to the portion of the source data, the fifth graphical element 518(5) may represent fifth time(s) that the fifth event represented by the fifth indicator 516(5) occurred to the portion of the source data, and the sixth graphical element 518(6) may represent sixth time(s) that the sixth event represented by the sixth indicator 516(6) occurred to the portion of the source data.

In the example of FIG. 5B, each portion of the source data may include a unique type of graphical element to represent the times at which the events occurred to the respective portions of the source data. For example, a first portion of the source data is represented by graphical elements 518 that include solid white blocks, a second portion of the source data is represented by graphical elements 520 (although only one is illustrated for clarity reasons) that include solid light grey blocks, a third portion of the source data is represented graphical elements 522 (although only one is illustrated for clarity reasons) that include solid dark grey blocks, and a fourth portion of the source data is represented by graphical elements 524 (although only one is illustrated for clarity reasons) that include solid black blocks. While these are just a few examples of graphical elements that may be used to represent the different portions of the source data, in other examples, additional and/or alternative graphical elements may be used.

In some examples, the information 514 may further include graphical elements 526-528 that indicate a problem occurred with the processing of a portion of the source data. For example, the first graphical element 526 may indicate that a problem did occur with the portion of the source data that is represented by the solid black blocks while the second graphic element 528 indicates where the problem occurred with the portion of the source data. For instance, and in the example of FIG. 5B, the problem with the portion of the source data may have occurred at the second event represented by the second indicator 516(2).

While the information 514 represented by the example of FIG. 5B only includes graphical elements 518-524 for four different portions of the source data, in other examples, the information 514 may include graphical element(s) for any number of the portions of the source data.

Figure 6:
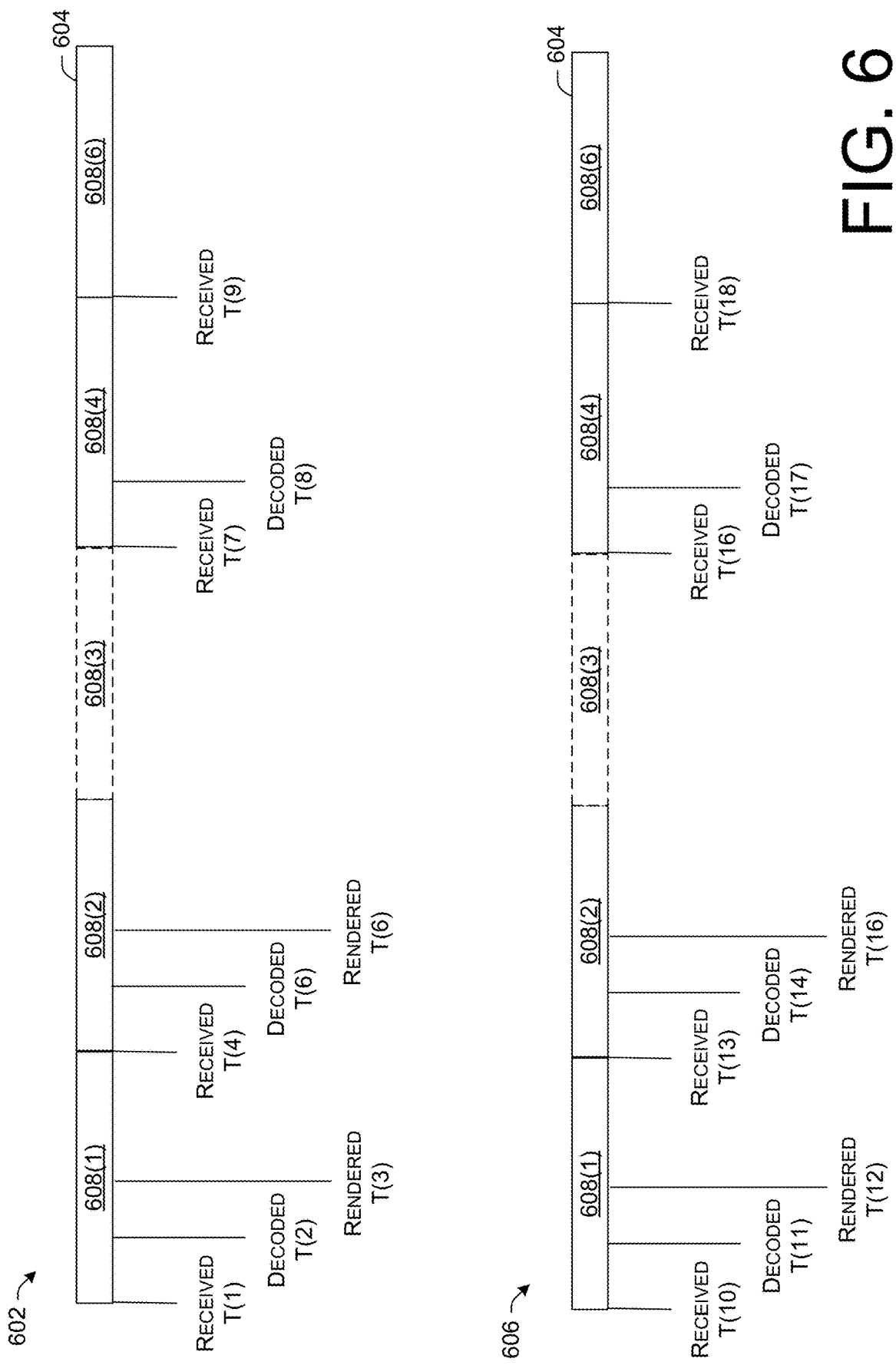
FIG. 6 illustrates an example of recreating the outputting of content using event data, in accordance with examples of the present disclosure.

FIG. 6 illustrates an example of recreating the outputting of content using the event data 222, in accordance with examples of the present disclosure. For instance, 602 may represent the processing of source data 604 (which may include, and/or represent, the second source data 218) that is performed by the electronic device 302 and 606 may represent the processing of the source data 604 that is performed by the remote system(s) 106 (and/or another device). In the example of FIG. 6, the source data 604 is video data that includes five frames 608(1)-(6). As such, events that occur with the source data 604 may include receiving, decoding, and rendering of the frames 608(1)-(6). However, in other examples, the source data 604 may include any other type of data. Additionally, in other examples, the events may include additional and/or alternative events.

As shown, the electronic device 302 may generate event data 222 representing at least a first identifier of the first frame 608(1), a first time T(1) that the first frame 608(1) was received, a second time T(2) that the first frame 608(1) was decoded, a third time T(3) that the first frame 608(1) was rendered, a second identifier of the second frame 608(2), a fourth time T(4) that the second frame 608(2) was received, a fifth time T(6) that the second frame 608(2) was decoded, a sixth time T(6) that the second frame 608(2) was rendered, a third identifier of the fourth frame 608(4), a seventh time T(7) that the fourth frame 608(4) was received, an eighth time T(8) that the fourth frame 608(4) was decoded, a fourth identifier of the fifth frame 608(6), and a ninth time T(9) that the fifth frame 608(6) was received. However, since the event data 222 is lacking such events, the third frame 608(3) may not have been received by the electronic device 302, the fourth frame 608(4) may not have been rendered by the electronic device 302, and the fifth frame 608(6) may not have been decoded or rendered by the electronic device 302.

The remote system(s) 106 may then process the source data 604 according to the event data 222. For example, and as shown, the remote system(s) 106 may determine that the first frame 608(1) is received at a tenth time T(10), decode the first frame 608(1) at an eleventh time T(11), render the first frame 608(1) at a twelfth time T(12), determine that the second frame 608(2) is received at a thirteenth time T(13), decode the second frame 608(2) at a fourteenth time T(14), render the second frame 608(2) at a fifteenth time T(16), determine that the fourth frame 608(4) is received at a sixteenth time T(16), decode the fourth frame 608(4) at a seventeenth time T(17), and determine that the fifth frame 608(6) is received at an eighteenth time T(18). However, the remote system(s) 106 may use the event data 222 to determine that the third frame 608(3) was not received, the fourth frame 608(4) was not rendered, and the fifth frame 608(6) was not decoded or rendered.

In the example of FIG. 6, the times T(0)-T(18) may be related to the times T(1)-T(9). For instance, time differences between each of the times T(10)-T(18) may be similar to time differences between each of the times T(1)-T(9). For example, the time difference between the second time T(2) that the first frame 608(1) was decoded and the third time T(3) that the first frame 608(1) was rendered may be substantially equal to the time difference between the eleventh time T(11) that the first frame 608(1) was decoded and the twelfth time T(12) that the first frame 608(1) was rendered. For another example, the time difference between the third time T(3) that the first frame 608(1) was rendered and the sixth time T(6) that the second frame 608(2) was rendered may be substantially equal to the time difference between the twelfth time T(12) that the first frame 608(1) was rendered and the fifteenth time T(16) that the second frame 608(2) was rendered.

Additionally, the rendering of the frames 608(1)-(6) by the remote system(s) 106 may be similar to the rendering of the frames 608(1)-(6) by the electronic device 302. For example, the remote system(s) 106 may cause a rendering of the first frame 608(1) and the second frame 608(2), but not cause a rendering of the third frame 608(3), the fourth frame 608(4), and the fifth frame 608(6), similar to the electronic device 302. In other words, the remote system(s) 106 may use the event data 222 to process the source data 604 similarly to how the electronic device 302 processed the source data 604. This way, the remote system(s) 106 recreate the outputting of the content represented by the source data 604 similarly to how the electronic device 302 outputted the content.

FIGS. 7-10 illustrate various processes for recreating the outputting of content by an electronic device. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 7:
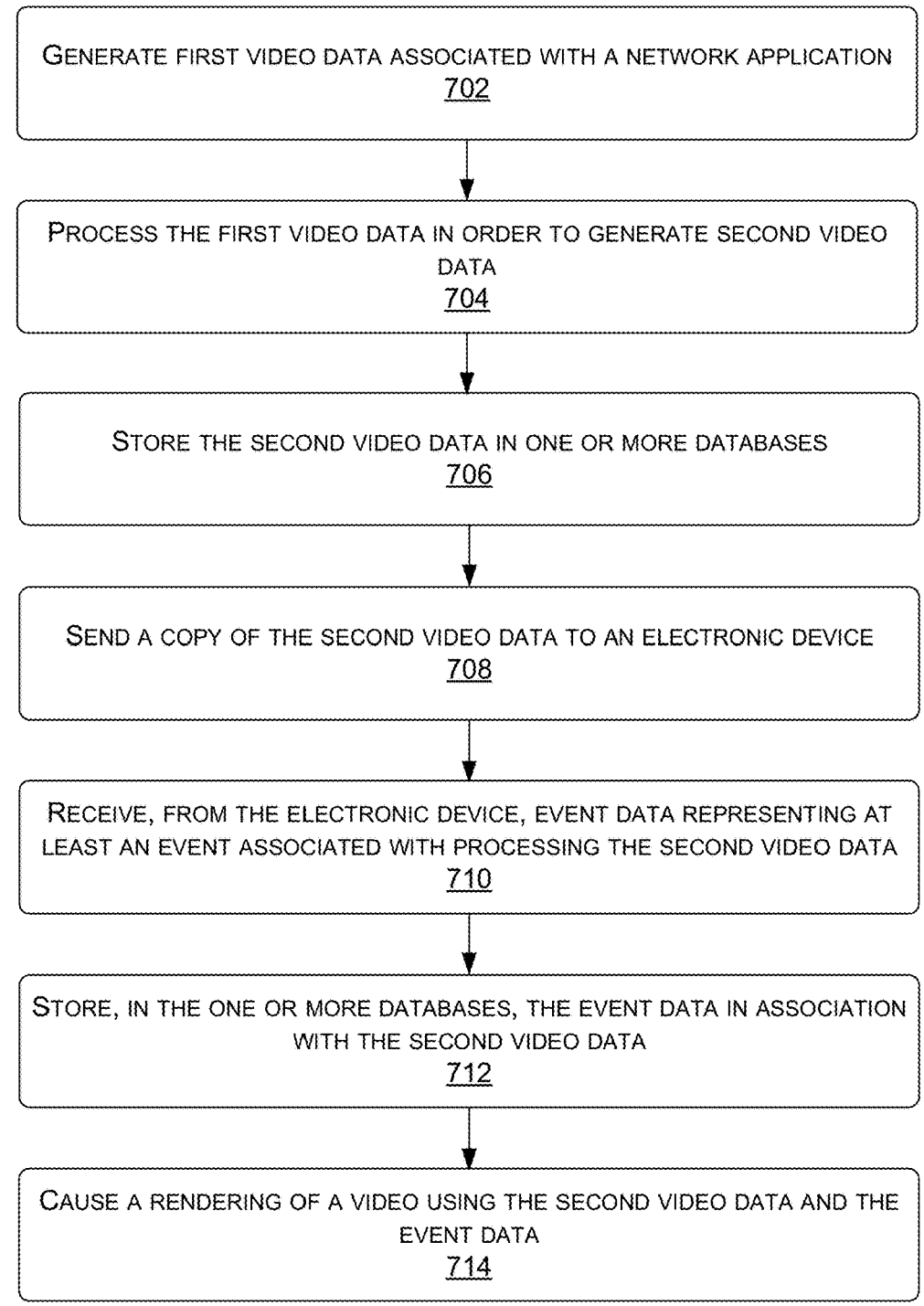
FIG. 7 illustrates an example process for recreating the rendering of a video by an electronic device, in accordance with examples of the present disclosure.

FIG. 7 illustrates an example process 700 for recreating the rendering of a video by an electronic device, in accordance with examples of the present disclosure. At 702, the process 700 may include generating first video data associated with a network application. For instance, the remote system(s) 106 may generate the first video data. In some examples, the first video data is associated with a network game. For instance, the remote system(s) 106 may be receiving input data and updating states of the network game using the input data, where the first video data represents a current state of the game. In some examples, the first video data represents raw video data associated with the network application.

At 704, the process 700 may include processing the first video data in order to generate second video data. For instance, the remote system(s) 106 may process the first video data in order to generate the second video data. In some examples, the remote system(s) 106 may process the first video data by encoding the first video data in order to generate the second video data (e.g., encoded video data). In some examples, the remote system(s) 106 may also generate identifier data representing identifiers associated with the frames of the video represented by the second video data.

At 706, the process 700 may include storing the second video data in one or more databases and at 708, the process 700 may include sending a copy of the second video data to an electronic device. For instance, the remote system(s) 106 may store the second video data in the one or more databases. In some examples, the remote system(s) 106 further store data that identifies the second video data, identifies the network application, and/or identifiers the electronic device. The remote system(s) 106 may then send a copy of the second video data to the electronic device. Based on receiving the second video data, the electronic device may then process the second video data in order to generate third video data. For example, the electronic device may decode the second video data in order to generate the third video data (e.g., decoded video data). The electronic device may then display the video represented by the third video data.

In some examples, the remote system(s) 106 may generate event data representing the processing of the first video data and/or the sending of the second video data. For example, the remote system(s) 106 may generate event data representing time(s) at which frame(s) represented by the first video data were encoded by the remote system(s) 106, time(s) at which frame(s) represented by the first video data failed encoding, time(s) at which frame(s) represented by the second video data were sent to the electronic device, time(s) at which frame(s) represented by the second source data were not sent to the electronic device, and/or the like. The remote system(s) 106 may then store the event data in association with the second video data.

At 710, the process 700 may include receiving, from the electronic device, event data representing at least an event associated with processing the second video data. For instance, the remote system(s) 106 may receive the event data from the electronic device. In some examples, the event data may represent events that occurred during the processing of the second video data by the electronic device. For example, an event may include, but is not limited to, frame(s) represented by the second video data being received, the frame(s) being queued, the frame(s) skipping from being queued, the frame(s) pending for the decoding process, the frame(s) being skipped from the decoding process, the frame(s) being decoded, the decoding of the frame(s) failing, the frame(s) being rendered, the frame(s) being skipped from rendering, and/or the like.

At 712, the process 700 may include storing, in the one or more databases, the event data in association with the second video data. For instance, the remote system(s) 106 may store the event data in association with the second video data. In some examples, to create the association, the remote system(s) 106 may generate diagnostics data that associates the second video data with the event data. In some examples, to create the association, the remote system(s) 106 may generate a data packet, such as a folder, that includes the second video data and the event data.

At 714, the process 700 may include causing a rendering of a video using the second video data and the event data. For instance, the remote system(s) 106 may cause the rendering of the video using the second video data and the event data. In some examples, to cause the rendering, the remote system(s) 106 process, using the event data, the second video data similarly as the electronic device. For example, the remote system(s) 106 may decode the second video data and/or render the video represented by the decoded video data similarly as the electronic device. This way, the rendering of the video by the remote system(s) 106 will be similar to the rendering of the video by the electronic device. In other words, the remote system(s) 106 "recreate" the rendering of the video by the electronic device.

Figure 8:
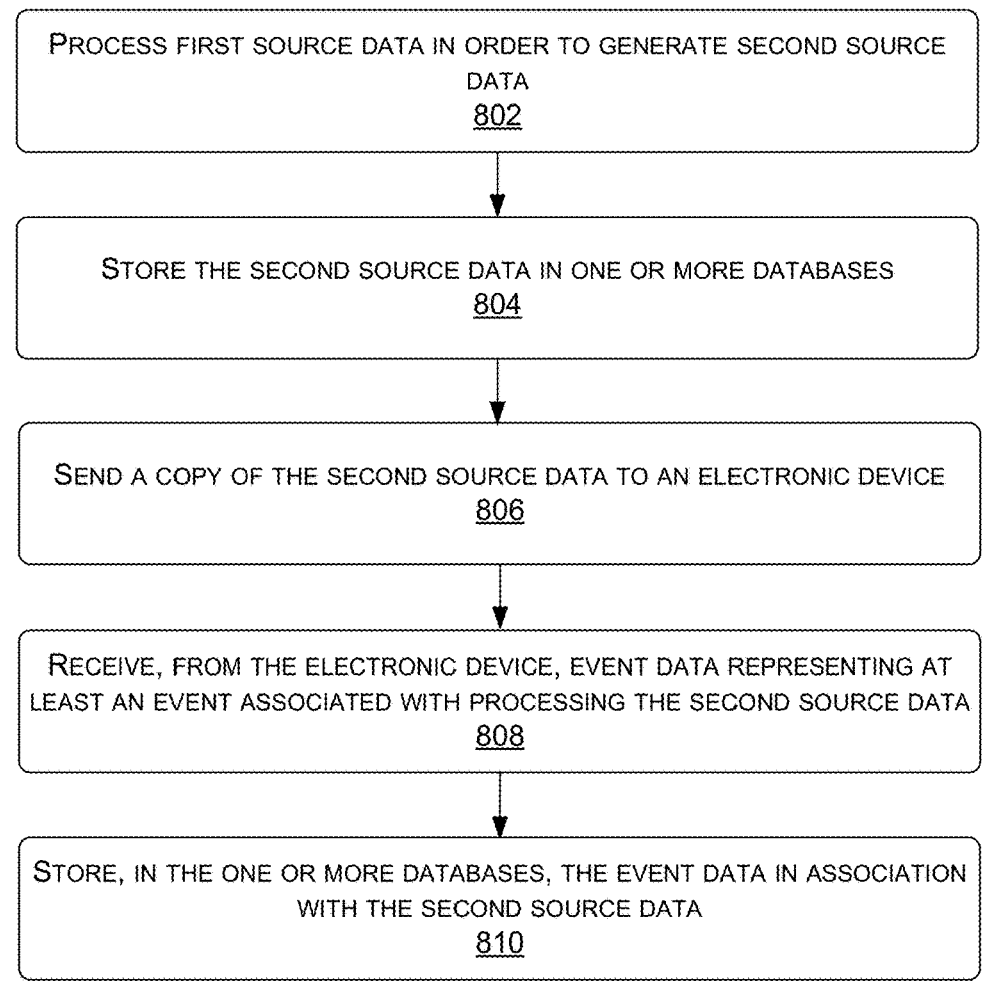
FIG. 8 illustrates an example process for recreating the outputting of content by an electronic device, in accordance with examples of the present disclosure.

FIG. 8 illustrates an example process 800 for recreating the outputting of content by an electronic device, in accordance with examples of the present disclosure. At 802, the process 800 may include processing first source data in order to generate second source data. For instance, the remote system(s) 106 may process the first source data in order to generate the second source data. The source data may include, but is not limited to, video data, image data, audio data, sensor data, and/or any other type of data. Additionally, in some examples, the processing of the first source data may include encoding the first source data in order to generate the second source data.

At 804, the process 800 may include storing the second source data in one or more databases and at 806, the process 800 may include sending a copy of the second source data to an electronic device. For instance, the remote system(s) 106 may store the second source data in the one or more databases. In some examples, the remote system(s) 106 further store data that identifies the second source data, identifies the network application, and/or identifiers the electronic device. The remote system(s) 106 may then send a copy of the second source data to the electronic device. Based on receiving the second source data, the electronic device may then process the second source data in order to generate third source data. For example, the electronic device may decode the second source data in order to generate the third source data (e.g., decoded video data). The electronic device may then output content represented by the third source data.

At 808, the process 800 may include receiving, from the electronic device, event data representing at least an event associated with processing the second source data. For instance, the remote system(s) 106 may receive the event data from the electronic device. In some examples, the event data may represent events that occurred during the processing of the second source data by the electronic device. For example, an event may include, but is not limited to, portion(s) represented by the second source data being received, the portion(s) being queued, the portion(s) skipping from being queued, the portion(s) pending for the decoding process, the portion(s) being skipped from the decoding process, the portion(s) being decoded, the decoding of the portion(s) failing, the portion(s) being rendered, the portion(s) being skipped from rendering, and/or the like.

At 810, the process 800 may include storing, in the one or more databases, the event data in association with the second source data. For instance, the remote system(s) 106 may store the event data in association with the second source data. In some examples, to create the association, the remote system(s) 106 may generate diagnostics data that associates the second source data with the event data. In some examples, to create the association, the remote system(s) 106 may generate a data packet, such as a folder, that includes the second source data and the event data. In some examples, the remote system(s) 106 may then cause a recreation of the outputting of the content using the second source data and the event data. For example, the remote system(s) 106 (and/or another device) may process and render the content represented by the second source data using the event data.

Figure 9:
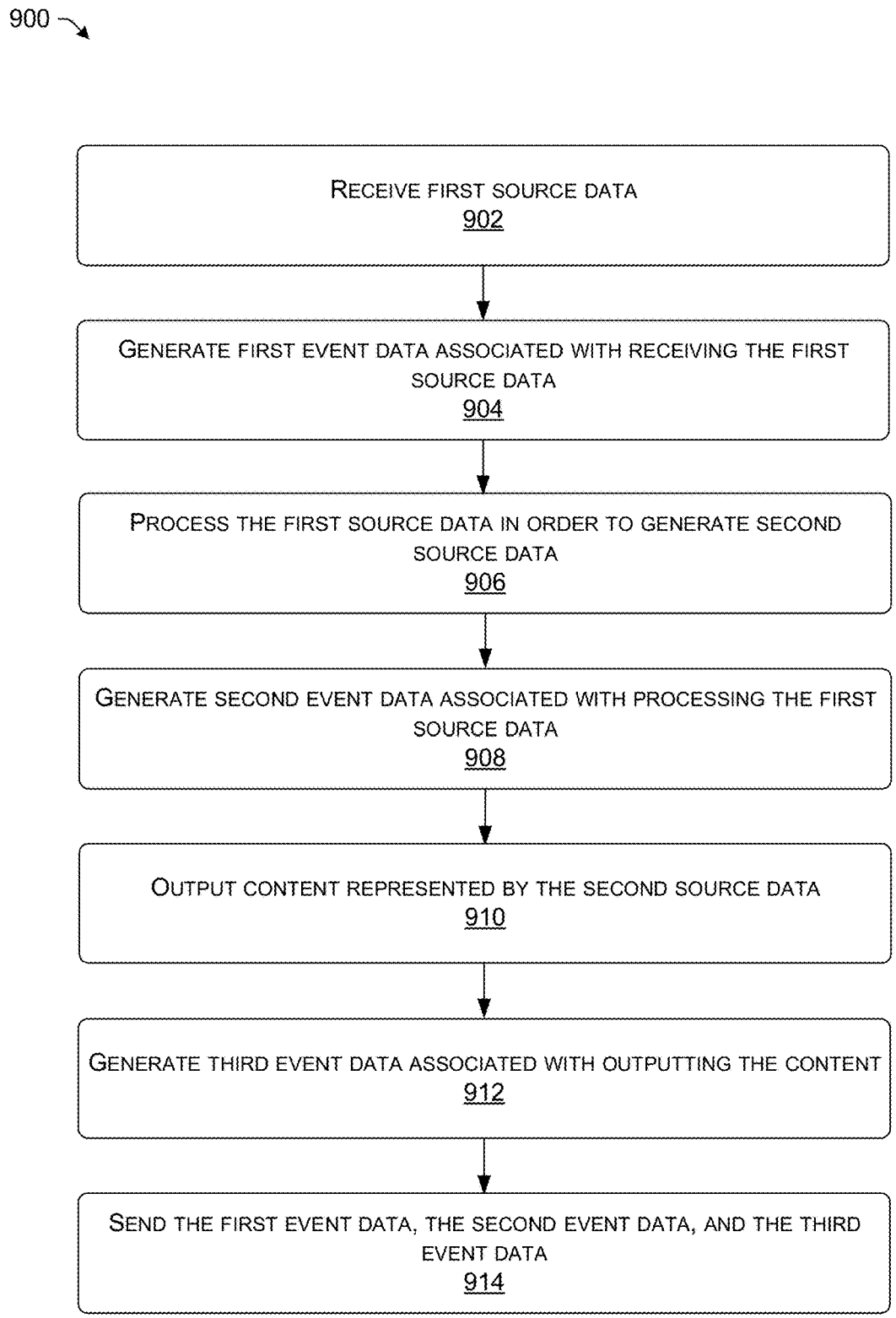
FIG. 9 illustrates an example process for generating data representing events associated with processing source data, in accordance with examples of the present disclosure.

FIG. 9 illustrates an example process 900 for generating data representing events associated with processing source data, in accordance with examples of the present disclosure. At 902, the process 900 may include receiving first source data and at 904, the process 900 may include generating first event data associated with receiving the first source data. For instance, the electronic device 302 may receive the first source data from the remote system(s) 106. In some examples, the first source data is first video data associated with the network application. The electronic device 302 may then generate the first event data. In some examples, the first event data represents times that portions of the first source data were received by the electronic device 302. For example, if the first source data is first video data, the first event data may represent identifiers of frames and times that the frames were received by the electronic device 302.

At 906, the process 900 may include processing the first source data in order to generate second source data and at 908, the process 900 may include generating second event data associated with processing the first source data. For instance, the electronic device 302 may process the first source data in order to generate the second source data. In some examples, processing the first source data may include decoding the first source data in order to generate the second source data. The electronic device 302 may then generate the second event data associated with the processing. For example, and again if the first source data is first video data, the second event data may represent identifiers of frames and times that processing events occurred with the frames.

At 910, the process 900 may include outputting content represented by the second source data and 912, the process 900 may include generating third event data associated with outputting the content. For instance, the electronic device 302 may output the content represented by the second source data. The electronic device 302 may then generate the third event data associated with the outputting of the content. For example, and again if the second source data is second video data, the third event data may represent identifiers of frames and times that the frames were rendered by the electronic device 302.

At 914, the process 900 may include sending the first event data, the second event data, and the third event data. For instance, the electronic device 302 may send, to the remote system(s) 106, the first event data, the second event data, and the third event data. In some examples, the electronic device 302 sends the event data as the electronic device 302 is generating the event data (e.g., in near real-time). In some examples, the electronic device 302 sends the event data at given times (e.g., at given time intervals, when finished accessing the network application, etc.). Still, in some examples, the electronic device 302 sends the event data when a problem occurs with the source data.

Figure 10:
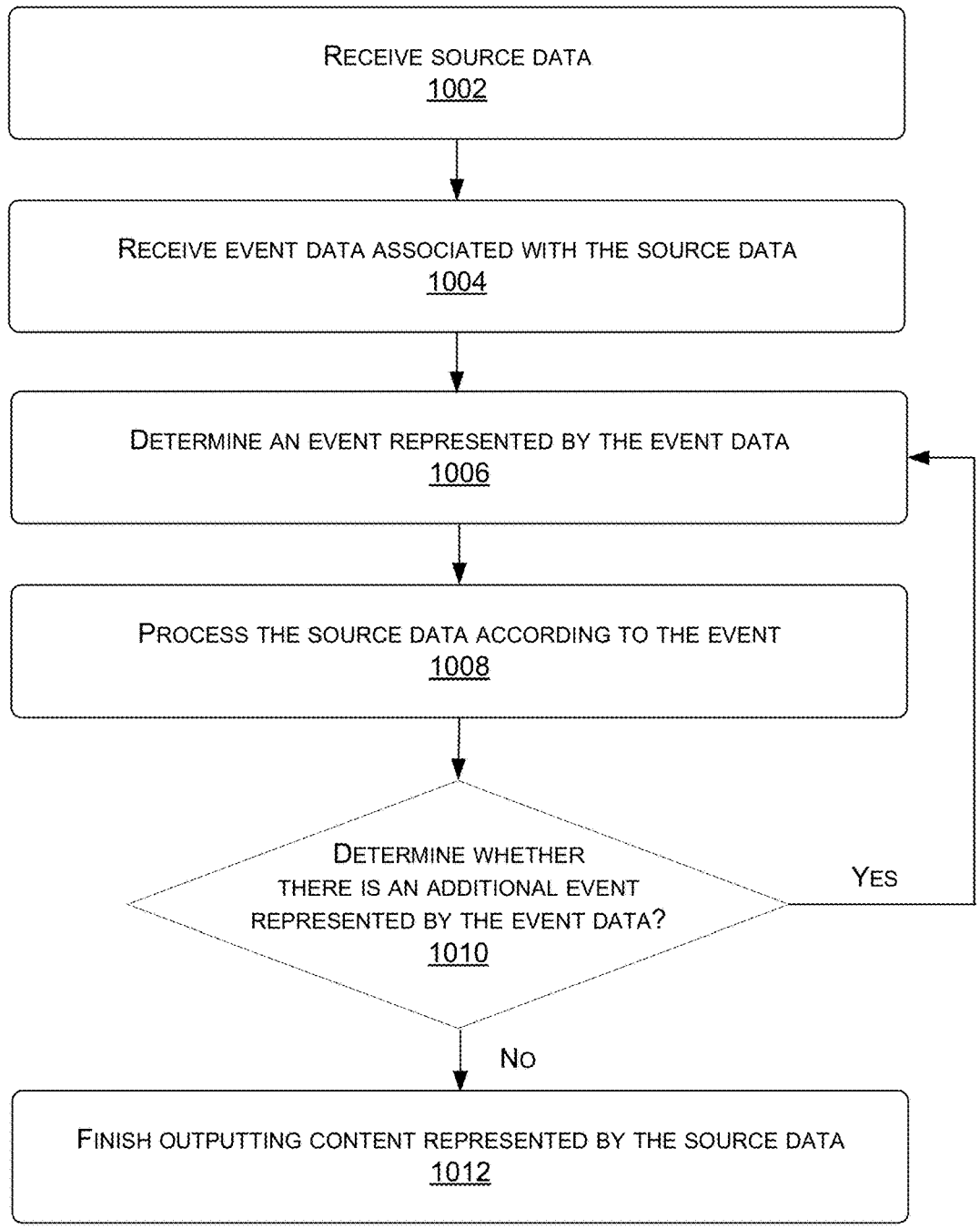
FIG. 10 illustrates an example process for recreating the outputting of content using event data, in accordance with examples of the present disclosure.

FIG. 10 illustrates an example process 1000 for recreating the outputting of content using event data, in accordance with examples of the present disclosure. At 1002, the process 1000 may include receiving source data and at 1004, the process 1000 may include receiving event data associated with the source data. For instance, the remote system(s) 106 (and/or an electronic device) may receive the source data and the event data. In some examples, the remote system(s) 106 (and/or the electronic device) receives the source data and/or the event data from one or more databases. In some examples, the electronic device receives the source data and/or the event data from the remote system(s) 106.

At 1006, the process 1000 may include determining an event represented by the event data. For instance, the remote system(s) 106 (and/or the electronic device) may analyze the event data in order to determine the event represented by the event data. As described herein, the event may include, but is not limited to, a portion of the source data being received, the portion being queued, the portion skipping from being queued, the portion pending for the decoding process, the portion being skipped from the decoding process, the portion being decoded, the decoding of the portion failing, the portion being rendered, the portion being skipped from rendering, and/or the like. In some examples, the source data is video data and the portion is one or more frames represented by the video data.

At 1008, the process 1000 may include processing the source data according to the event. For instance, the remote system(s) 106 (and/or the electronic device) may process the source data according to the event. In some examples, processing the source data according to the event may include causing a similar event to occur with the portion of the source data at a time that is associated with the time that the event occurred. For a first example, if the event indicates that the portion of the source data was decoded at a first time, then processing the source data according to the event may include decoding the portion of the source data at a second time that is related to the first time. For a second example, if the event indicates that content represented by the portion of the source data was rendered at a third time, then processing the source data according to the event may include rendering the content represented by the portion of the source data at a fourth time that is related to the third time.

At 1010, the process 1000 may include determining whether there is an additional event represented by the event data. For instance, the remote system(s) 106 (and/or the electronic device) may determine if the event data represents one or more additional events. If, at 1010, it is determined that the event data represents the additional event, then the process 1000 may repeat starting back at 1006. For instance, if the remote system(s) 106 (and/or the electronic device) determines that the event data represents the additional event, then the remote system(s) 106 (and/or the electronic device) may repeat the process 1000 starting at 1006 by processing an additional portion of the source data using the event data.

However, if, at 1010, it is determined that the event data does not represent the additional event, then at 1012, the process 1000 may include finishing outputting content represented by the source data. For instance, if the remote system(s) 106 (and/or the electronic device) determines that the event data does not represent the additional event, then the remote system(s) 106 (and/or the electronic device) may determine that the outputting of the content is finished.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
one or more processors; and
one or more computer-readable media storing instructions that, when executed by the one or more processors, cause the system to perform operations comprising:
processing source video data representing a current state of a network game;
encoding the source video data in order to generate encoded video data, the encoded video data representing the current state of the network game and at least a first encoded frame of the source video data and a second encoded frame of the source video data;
storing the encoded video data in one or more databases;
sending, to an electronic device, a copy of the encoded video data for outputting by the electronic device;
receiving, from the electronic device, event data associated with the electronic device:
receiving the copy of the encoded video data,
decoding the copy of the encoded video data, or
rendering the copy of the encoded video data, the event data representing at least:
a first time that the first encoded frame was decoded in order to generate a first decoded frame;
a second time that the first decoded frame was rendered by the electronic device;
a first indication that the electronic device did not decode the second encoded frame to generate a second decoded frame; or
a second indication that the electronic device did not render the second decoded frame;
storing, in the one or more databases, the event data in association with the encoded video data;
processing, by the system and based at least in part on the event data, the encoded video data in order to generate decoded video data representing the rendering of the current state of the network game, by the electronic device, the processing comprising:
decoding, at a third time that is based at least in part on the first time, the first encoded frame in order to generate a third decoded frame similar to the first decoded frame;

causing rendering, at a fourth time that is based at least in part on the second time, of the third decoded frame;
refraining from decoding, based at least in part on the first indication that the electronic device did not decode the second encoded frame, the second encoded frame in order to generate a fourth decoded frame; and
refraining from rendering, based at least in part on the second indication that the electronic device did not render the third decoded frame, the fourth decoded frame; and
causing a display to present content represented by the decoded video data such that the system recreates the rendering of the current state of the network game similarly as the electronic device rendered the current state of the network game.

2. The system as recited in claim 1, the operations further comprising receiving, from the electronic device, input data indicating that a problem associated with the processing of the encoded video data occurred.

3. A method comprising:
processing, by a system, source video data representing a current state of a network game;
encoding the source video data in order to generate encoded video data representing the current state of the network game;
storing the encoded video data in one or more databases;
sending, to an electronic device, a copy of the encoded video data for rendering the current state of the network game by the electronic device;
receiving, from the electronic device, event data representing an event that occurred with the electronic device:
  receiving an encoded frame of the copy of the encoded video data,
  decoding the encoded frame of the copy of the encoded video data, or
  outputting the encoded frame of the copy of the encoded video data, the event data comprising at least:
    a first time that the encoded frame was decoded in order to generate a first decoded frame; and
    an indication that outputting of the first decoded frame was skipped;
storing, in the one or more databases, the event data in association with the encoded video data;
decoding, by the system and based at least in part on the event data, the encoded video data in order to:
  decode the encoded frame in order to generate a second decoded frame in a same order and in a similar time as the electronic device decoded the encoded frame,
  generate decoded video data representing the rendering of the current state of the network game, by the electronic device, using the event data and the second decoded frame; and
  cause rendering of first content represented by the decoded video data, wherein decoding the encoded video data by the system comprises at least:
    decoding, at a second time that is based at least in part on the first time, the encoded frame of the encoded video data in order to generate a second decoded frame; and
    based at least in part on the indication that the outputting of the first decoded frame skipped, refraining from rendering second content represented by the second decoded frame such that the system recreates the rendering of the current state of the network game similarly as the electronic device rendered the current state of the network game.

4. The method as recited in claim 3, wherein the event data representing the event that occurred with the electronic device receiving the encoded frame of the copy of the encoded video data, decoding the encoded frame of the copy of the encoded video data, or outputting the encoded frame of the copy of the encoded video data comprises at least one of:
an event identifier associated with the encoded frame of the copy of the encoded video data; or
an event time that the event occurred.

5. The method as recited in claim 3, wherein the event data representing the event that occurred with the electronic device receiving the encoded frame of the copy of the encoded video data, decoding the encoded frame of the copy of the encoded video data, or outputting the encoded frame of the copy of the encoded video data comprises at least one of:
a second time that the encoded frame was received;
a third time that the encoded frame was queued; or
a fourth time that decoding of the encoded frame failed.

6. The method as recited in claim 3, wherein:
the event data comprises at least
  a third time that second content represented by the first decoded frame was output by the electronic device; and
decoding the encoded video data comprises at least:
  outputting, at a fourth time that is based at least in part on the third time, the first content represented by the second decoded frame.

7. The method as recited in claim 3, wherein:
the encoded frame is a first encoded frame;
the event data further represents that the electronic device did not receive a second encoded frame of the encoded video data; and
the method further comprises, based at least in part on the event data, refraining from decoding the second encoded frame of the encoded video data.

8. The method as recited in claim 3, wherein:
the encoded frame is a first encoded frame;
the event is a first event;
the event data comprise:
  a first time that the first event associated with the first encoded frame occurred; and
  a second time that a second event associated with a second encoded frame of the encoded video data occurred;
decoding the encoded video data comprises at least:
  causing a third event, that is similar to the first event, to occur with the first encoded frame of the encoded video data at a third time; and
  causing a fourth event, that is similar to the second event, to occur with the second encoded frame of the encoded video data at a fourth time; and
  a first time difference between the first time and the second time is approximately equal to a second time difference between the third time and the fourth time.

9. The method as recited in claim 3, wherein:
decoding the encoded video data comprises at least:
  decoding, at a first time that is based at least in part on the event data, the encoded frame in order to generate the decoded frame; and
  rendering, at a second time that is based at least in part on the event data, the content represented by the decoded frame.

10. The method as recited in claim 3, further comprising:
generating additional event data representing at least an additional event associated with encoding a frame of the source video data,
and wherein generating the encoded video data is further based at least in part on the additional event data.

11. The method as recited in claim 3, further comprising receiving, from the electronic device, input data indicating that a problem associated with the encoded video data had occurred.

12. The method as recited in claim 3, further comprising:
receiving input data from at least one of the electronic device or a control device; and
processing the source video data by at least updating the first state of the network game using the input data, the source video data representing a second state of the network game.

13. The method as recited in claim 3, further comprising:
generating a user interface, the user interface including at least:
the content; and
information describing at least the event as represented by the event data,
and wherein to cause rendering of the content represented by the decoded video data comprises at least causing an additional electronic device to display the user interface.

14. The method as recited in claim 3, wherein the system encodes the source video data using data compression.

15. The method as recited in claim 3, wherein the system encodes the source video data using lossy compression or lossless compression.

16. The method as recited in claim 3, wherein the indication that the outputting of the first decoded frame was skipped includes an additional indication that the electronic device determined to skip the outputting of the first decoded frame in order to maintain a low latency such that the electronic device continuously renders the current state of the network game.

17. A system comprising:
one or more processors; and
one or more computer-readable media storing instructions that, when executed by the one or more processors, cause the system to perform operations comprising:
processing first video data representing a current state of a network game;
encoding the source video data in order to generate encoded video data representing the current state of the network game;
storing the encoded video data in one or more databases;
sending, to an electronic device, a copy of the encoded video data for rendering the current state of the network game by the electronic device;
receiving, from the electronic device, event data representing at least an event that occurred with the electronic device:
receiving an encoded frame of the copy of the encoded video data,
decoding the encoded frame of the copy of the encoded video data, or
outputting the encoded frame of the copy of the encoded video data, the event data comprising at least:
a first time that the encoded frame was decoded in order to generate a first decoded frame; and
an indication that outputting of the first decoded frame was not output;
storing the event data in the one or more databases;
generating diagnostics data that associates the event data with the encoded video data;
generating decoded video data representing the rendering of the current state of the network game, by the electronic device, using the event data and the second decoded frame; and
cause rendering of first content represented by the decoded video data, wherein decoding the encoded video data by the system comprises at least:
decoding, at a second time that is based at least in part on the first time, the encoded frame of the encoded video data in order to generate a second decoded frame; and
based at least in part on the indication that the outputting of the first decoded frame skipped, refraining from rendering second content represented by the second decoded frame such that the system recreates the rendering of the current state of the network game similarly as the electronic device rendered the current state of the network game.

18. The system as recited in claim 17, wherein the event data representing the event that occurred with the electronic device:
receiving the encoded frame of the copy of the encoded video data,
decoding the encoded frame of the copy of the encoded video data, or
outputting the encoded frame of the copy of the encoded video data comprises at least one of:
a second time that the encoded frame was received;
a third time that the encoded frame was queued; or
a fourth time that decoding of the encoded frame failed.

19. The system as recited in claim 17, wherein:
the electronic device continuously outputs the copy of the encoded video data in real-time,
the sending of the copy of the encoded video data to the electronic device comprises sending for a first time, to the electronic device, the copy of the encoded video data for outputting by the electronic device, and
the operations further comprise refraining from sending for a second time, to the electronic device, the copy of the encoded video data for outputting by the electronic device to maintain low latency.

* * * * *